(12) United States Patent
Breed et al.

(10) Patent No.: US 6,206,129 B1
(45) Date of Patent: *Mar. 27, 2001

(54) CRUSH SENSING VEHICLE CRASH SENSOR

(75) Inventors: David S. Breed, Boonton Township; William Thomas Sanders, Rockaway Twp., both of NJ (US); Richard M. Downs, Jr., Arlington, VA (US)

(73) Assignee: Automotive Technologies International, Inc., Denville, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/514,986

(22) Filed: Aug. 14, 1995

Related U.S. Application Data

(63) Continuation-in-part of application No. 08/024,076, filed on Mar. 1, 1993, now Pat. No. 5,441,301, which is a continuation-in-part of application No. 07/795,035, filed on Nov. 20, 1991, now Pat. No. 5,326,133, and a continuation-in-part of application No. 07/727,756, filed on Jul. 9, 1991, now abandoned, and a continuation-in-part of application No. 08/443,002, filed on May 17, 1995.

(51) Int. Cl.$^7$ ................................................ B60R 21/32
(52) U.S. Cl. ............................................ 180/274; 280/735
(58) Field of Search ............................ 280/735, 730.2; 180/274; 200/61.44, 86 R, 61.72, 61.73, 61.43

(56) References Cited

U.S. PATENT DOCUMENTS

| | | | |
|---|---|---|---|
| 2,437,969 | * 3/1948 | Paul | 200/86 R |
| 3,859,482 | 1/1975 | Matsui et al. | 200/61.08 |
| 4,060,705 | * 11/1977 | Peachey | 200/86 R |
| 4,995,639 | 2/1991 | Breed | 280/735 |
| 5,231,253 | 7/1993 | Breed et al. | 200/61.45 R |
| 5,322,323 | * 6/1994 | Ohno et al. | 280/735 |
| 5,441,301 | * 8/1995 | Breed et al. | 280/735 |

OTHER PUBLICATIONS

A Critique of Single Point Sensing , Society of Automotive Engineers, David S. Breed et al. Paper No. 920124, 1992.

"Using Vehicle Deformation to Sense Crashes", David S. Breed et al., Presented at the International Body Engineering Conference, Sep. 21,1993–Sep. 23,1993.

"Side Impact Airbag System Technology", David S. Breed, Presented at the International Body Engineering Conference, Sep. 26, 1994–Sep. 29, 1994.

"A Complete Frontal Crash Sensor System", Society of Automotive Engineers, David S. Breed et al., Paper No. 930650, Mar. 1–5, 1993.

"A Complete Frontal Crash Sensor System–II", Proceedings of Enhanced Safety of Vehicle Conference, Munich, Germany, 1994, Published by the U.S. Dept. of Trans., National Highway Safety Administration, Washington, D.C. , pp. 1377–1387.

(List continued on next page.)

Primary Examiner—Paul N. Dickson
(74) Attorney, Agent, or Firm—Brian Roffe

(57) ABSTRACT

A vehicle crush detecting device including an electrically conducting tube with an electrically conducting rod concentrically positioned within the tube along with insulating means positioned at at least two points between the rod and the tube to insulate the rod from the tube. The electrically conducting tube is deformed during a vehicle crash by a force greater than a predetermined magnitude which causes the tube to contact the rod in response to the crush of a vehicle. The crush sensor is mounted at the rear boundary of the Crush Sensor Zone of the vehicle for frontal and rear impacts and in the door or other appropriate side position for side. The sensor is used to sense crashes for the deployment of automobile passive restraint systems such as airbags.

17 Claims, 15 Drawing Sheets

OTHER PUBLICATIONS

Performance of a Crush Sensor for Use with Automotive Air Bag Systems, Society of Automotive Engineers, David S. Breed et al. Paper No. 920122, Feb. 24, 1992–Feb. 28, 1992.

"Sensing Side Impacts",Society of Automotive Engineers, David S. Breed et al., Paper No. 940561, Feb. 28–Mar. 3,1994.

"Problems in Design and Engineering of Air Bag Systems", Society of Automotive Engineers, David S. Breed et al., Paper No. 880724, Feb. 29–Mar.4, 1988.

"Trends in Sensing Frontal Impacts", Society of Automotive Engineers, David S. Breed et al., Paper No. 890750, Feb. 27–Mar. 3, 1989.

"Trends in Sensing Side Impacts", Society of Automotive Engineers, David S. Breed et al., Paper No. 890603, Feb. 27–Mar. 3, 1989.

"Are Barrier Crashes Sufficient For Evaluating Air Bag Sensor Performance?", Society of Automotive Engineers, David S. Breed et al., Paper No. 900548, Feb. 26–Mar. 2, 1990.

"Characterization of the Cross–Axis Acceleration Crash Sensor Environment and Test Method", Society of Automotive Engineers, F. Shokoohi et al.., Paper No. 930651, Mar. 1–5, 1993.

"The Inertial Flow Crash Sensor and its Application to Air Bag Deplotment", David S.Breed et al. Twelfth International Technical Conference on Experimental Safety Vehicles, Sweden, May 29–Jun. 1, 1989.

* cited by examiner

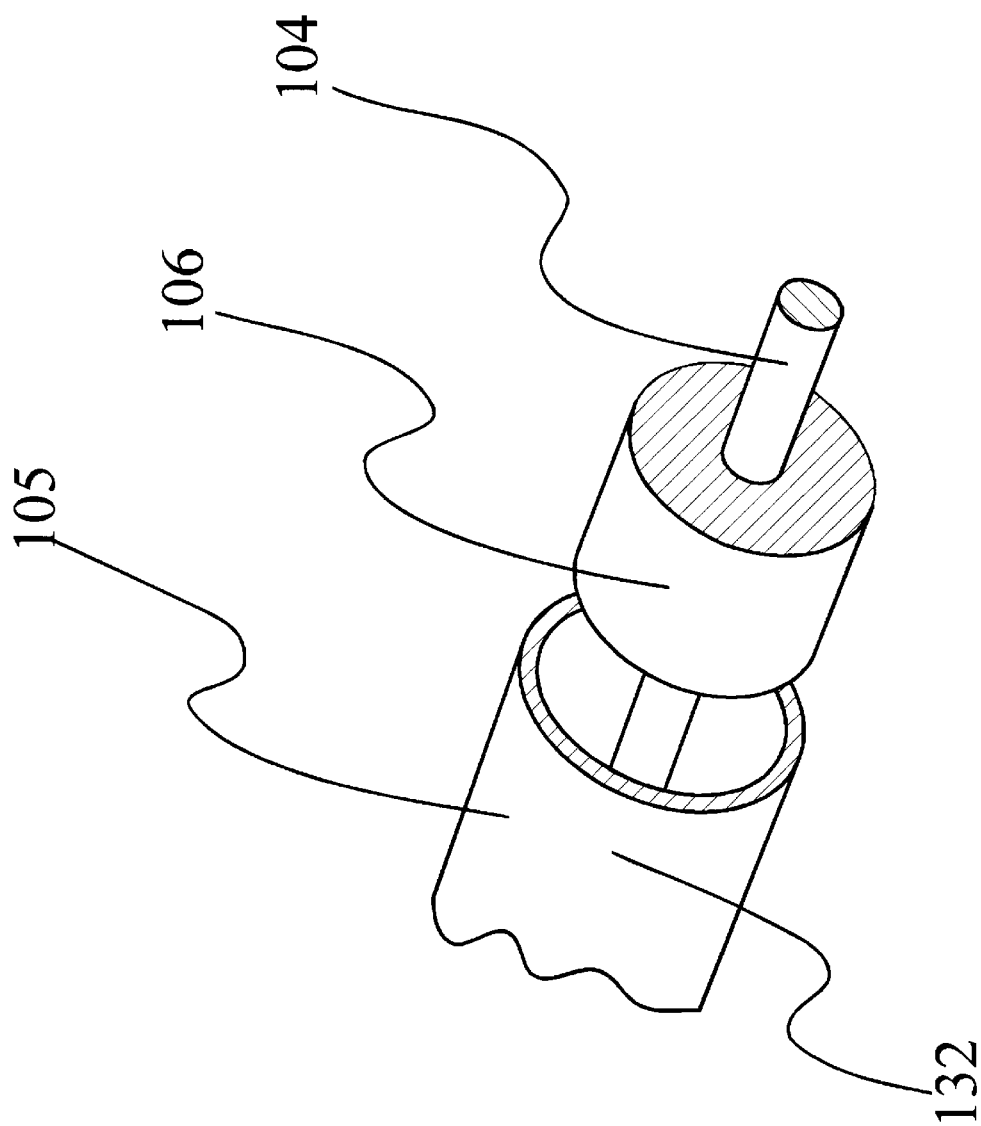

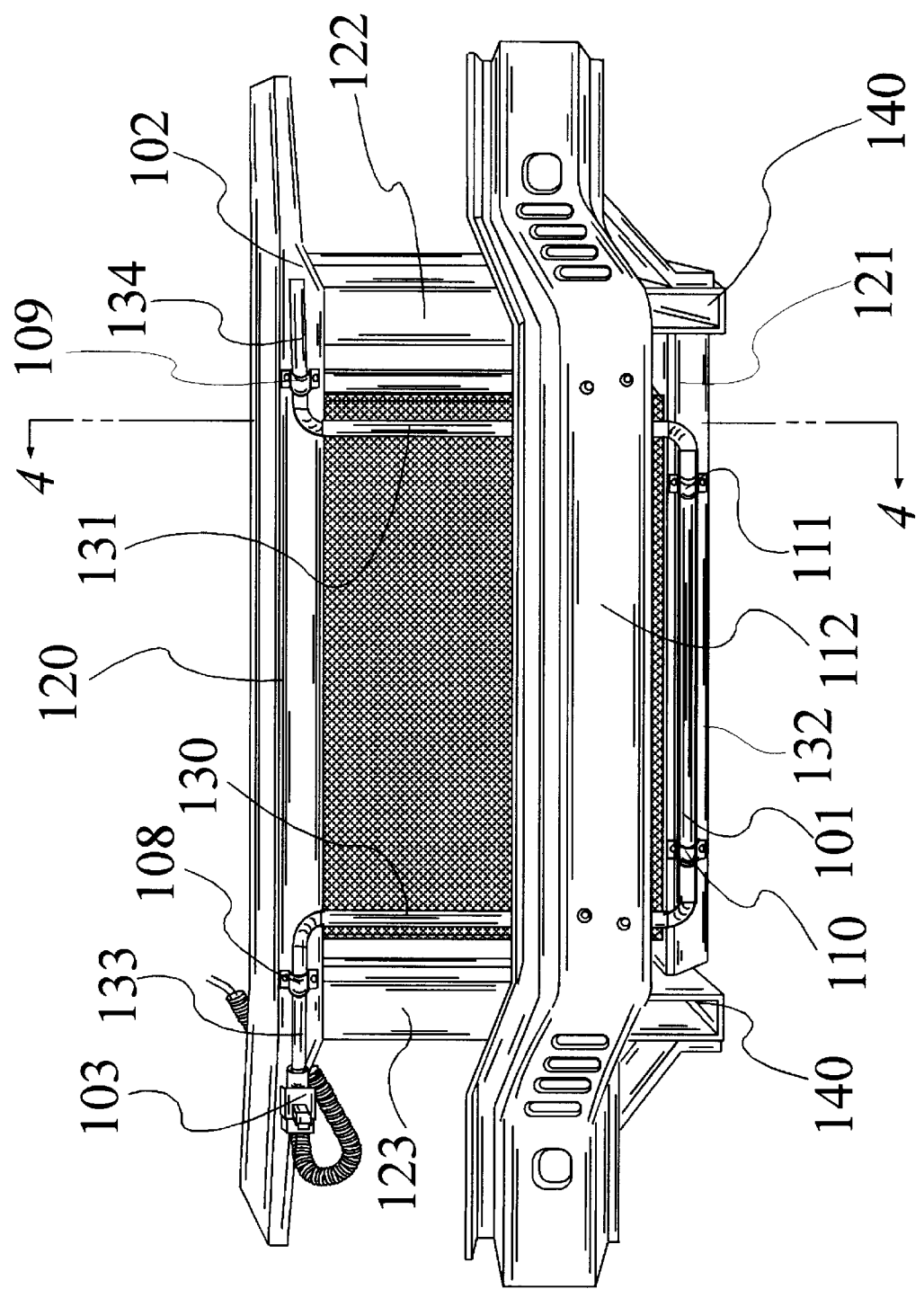

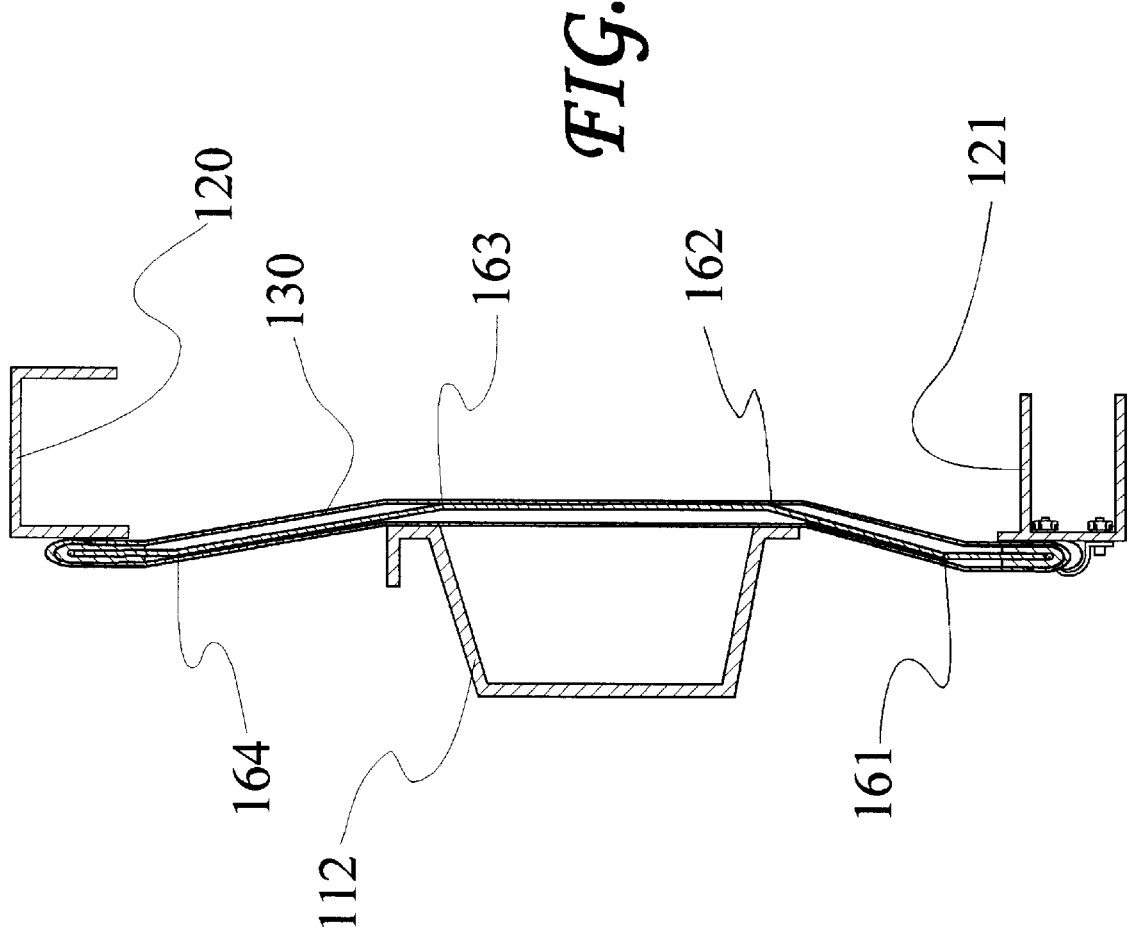

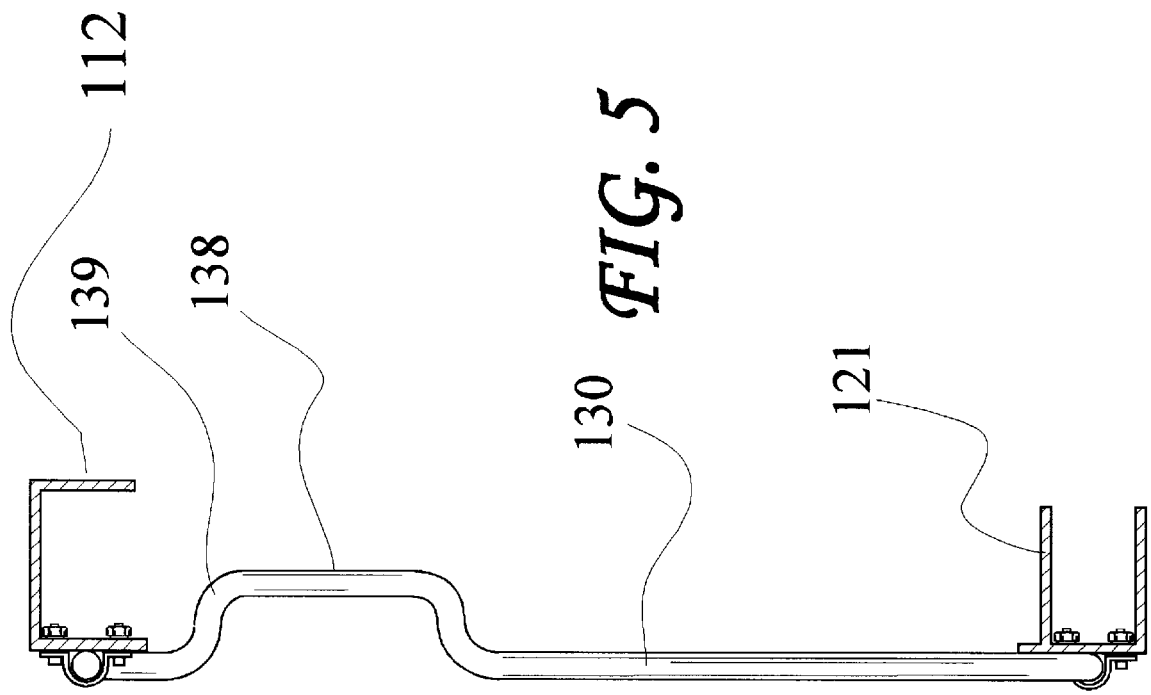
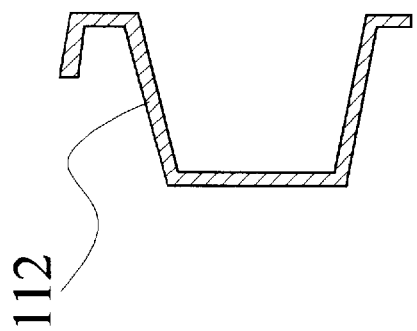
FIG. 5

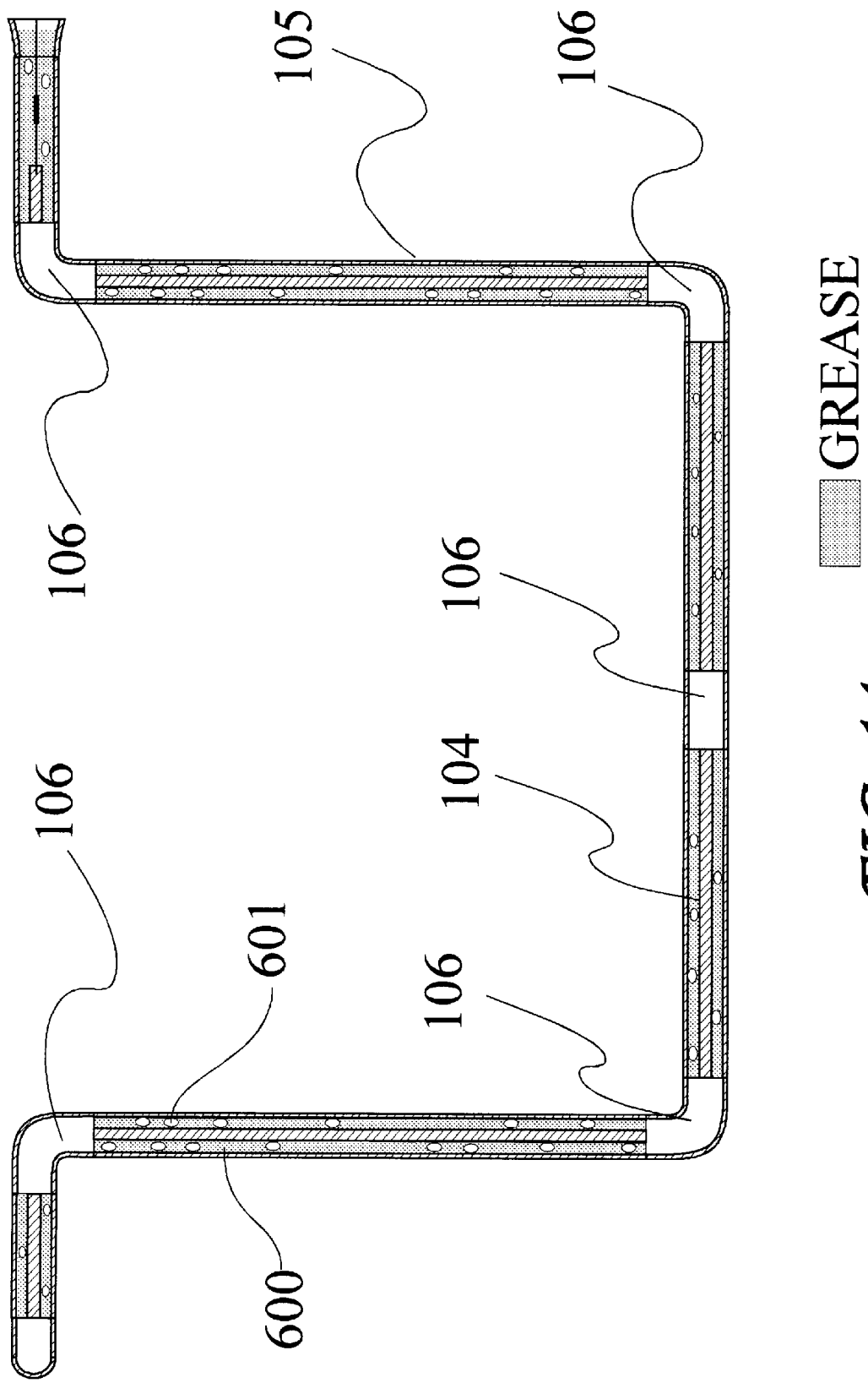

CRUSH SENSING VEHICLE CRASH SENSOR

CROSS REFERENCE TO RELATED APPLICATIONS

This application is a continuation-in-part of U.S. patent application Ser. No. 08/024,076 filed Mar. 1, 1993, now U.S. Pat. No. 5,441,301, which in turn is a continuation-in-part of (i) U.S. patent application Ser. No. 07/795,035 filed Nov. 20, 1991, now U.S. Pat. No. 5,326,133, (ii) of U.S. patent application Ser. No. 07/727,756, filed Jul. 9, 1991, now abandoned, and (iii) of U.S. patent application Ser. No. 08/443,002 filed May 17, 1995, all of which are included herein by reference. This invention is also an improvement on the invention disclosed in U.S. Pat. No. 4,995,639 and a full discussion of the background of this general type of sensor is disclosed in that patent and is included herein by reference.

BACKGROUND OF THE INVENTION

In Society of Automotive Engineers (SAE) paper No. 930650 entitled "A Complete Frontal Crash Sensor System-I", by Breed et al, which is included herein by reference, the authors conclude that airbag crash sensors mounted in the crush zone are necessary for the proper sensing of airbag-required frontal crashes. They also conclude that such sensors should sense crashes to all portions of the front of the vehicle and that sensors which sense the crush of the vehicle are preferred. The theory of crush sensing is presented in the above-referenced U.S. patent applications and in SAE paper No. 920122 entitled, "Performance of a Crush Sensor for Use with Automotive Airbag Systems", by Breed et al, which is included herein by reference.

The tape switch and rod-in-tube crush sensors described in the above referenced U.S. patent applications, have performed successfully on various staged vehicle frontal crashes into barriers and poles. These sensors are generally not sufficient for sensing side impacts as discussed in Breed, D. S., Sanders, W. T. and Castelli, V., "Sensing Side Impacts", Society of Automotive Engineers (SAE) paper No. 940561, 1994, however, they can be successful when used in conjunction with a passenger compartment mounted electronic sensor or as a safing sensor. Similarly, they are also being considered when a deployable device, such as an airbag, is used for rear impacts.

Other technical papers which provide pertinent background information to this invention include:
1. Breed, D. S., Castelli, V. "Problems in Design and Engineering of Air Bag Systems", Society of Automotive Engineers paper No. 880724, 1988.
2. Breed, D. S., Castelli, V. "Trends in Sensing Frontal Impacts", Society of Automotive Engineers paper No. 890750, 1989.
3. Castelli, V., Breed, D. S. "Trends in Sensing Side Impacts", Society of Automotive Engineers paper No. 890603, 1989.
4. Breed, D. S., Castelli, V. and Shokoohi, F. "Are Barrier Crashes Sufficient for Evaluating Air Bag Sensor Performance?", Society of Automotive Engineers paper No. 900548, 1990.
5. Breed, D. S., Sanders, W. T. and Castelli, V. "A Critique of Single Point Crash Sensing", Society of Automotive Engineers paper No. 920124, 1992.
6. Breed, D. S., Sanders, W. T. and Castelli, V. "Performance of a Crush Sensor for Use with Automobile airbag Systems", Society of Automotive Engineers paper No. 920122, 1992.
7. Shokoohi, F., Sanders, W. T., Castelli, V., and Breed, D. S. "Cross Axis Specifications For Crash Sensors", Automotive Technologies International Report, ATI 12004, 1991. Society of Automotive Engineers paper No. 930651, 1993.
8. Breed, D. S., Sanders, W. T. and Castelli, V. "A complete Frontal Crash Sensor System-I", Society of Automotive Engineers paper No. 930650, 1993.
9. Breed, D. S. and Sanders, W. T. "Using Vehicle Deformation to Sense Crashes", Presented at the International Body and Engineering Conference, Detroit Mich., 1993.
10. Breed, D. S., Sanders, W. T. and Castelli, V., "A complete Frontal Crash Sensor System-II", Proceedings Enhanced Safety of Vehicles Conference, Munich, 1994, Published by the U.S. Department of Transportation, National Highway Traffic Safety Administration, Washington, DC
11. Breed, D. S., Sanders, W. T. and Castelli, V., "Sensing Side Impacts", Society of Automotive Engineers paper No. 940561, 1994.
12. Breed, D. S., "Side Impact Airbag System Technology", Presented at the International Body and Engineering Conference, Detroit Mich., 1994.

Other relevant prior art includes U.S. Pat. No. 3,859,482 to Matsui which will now be discussed in some detail. Matsui shows various devices which respond to the force (pressure using Matsui's terminology) which accompanies a vehicle frontal crash when material in the extreme front of the vehicle, or the impacting object itself, impacts the force detecting device. Matsui also mentions, but does not illustrate, the use of his force detectors on the rear and the side of the vehicle. The Matsui devices discriminate crashes based on the magnitude of this force on the detecting device, which as stated in the patent, are on the order of tons (metric). Many devices are described in Matsui however the following generalizations apply:

1. The Matsui sensors are mechanical pressure (force) detecting devices. This is stated in the title of the patent and throughout, there is only discussion of pressure being applied directly to the sensor. Except in those cases where a tape switch or a rope is used as the forwardmost point on the vehicle, there is always associated with the device a "Presser Member" whose function is to apply force directly to the sensor. Most importantly, this is a device which determines the severity of a crash based on force where the force is on the order of metric tons.

As will be discussed in greater detail below, the devices disclosed in the instant invention are displacement sensors not force sensors, they do not require tons of force to actuate, are never placed at the forward most point on the vehicle, a "Presser Member" is not required or used, and they are designed to function by bending and not by compression.

2. The Matsui sensors are used in combination with a high level deceleration detector. In all cases, the Matsui sensor is used in conjunction with an acceleration sensor. This sensor is a low level discriminating sensor which is different from the safing sensor used on most current airbag systems. The difference between these types of sensors is that the Matsui sensor is not used alone to discriminate the crash, that is to determine whether the crash requires deployment of an airbag. An additional discriminating sensor is required. By contrast, in conventional airbag systems, a safing or arming sensor is used to guard against electrical shorts in the sensor perhaps caused by vehicle maintenance. The safing sensor will trigger on pothole impacts for example. It is not intended to provide information as to the severity of the crash. This is not the case in the Matsui acceleration sensor which is used in series with a force sensor. This is clear by the illustrated embodiment in FIG. 29 which shows that the deceleration sensor requires a value of acceleration to trigger which is shown to be a substantial percent of the peak deceleration of curve A which is on the order of about 40 G's (see for example FIG. 1 of reference 1 above). In contrast, typical safing for arming sensors trigger on a deceleration of less than about 2 G's.

Again, as will be discussed in detail below, in contrast, the sensors of the present invention do not require a high level deceleration sensor or any deceleration sensor for that matter. When the sensors of this invention are used as discriminating sensors, a low level safing or arming sensor can optionally be used to provide electrical isolation of the inflator initiator so that momentary electrical shorts do not cause deployment of the airbag. In other cases, they are used as safing sensors, for example in side impact sensing arrangements. There is no hint in Matsui of using his sensors as safing sensors.

3. In many illustrations of the Matsui devices a frangible system is used. In one case, for example, a wire inside a glass tube, or a glass rod or tube which has been plated with silver, is used. In some of these cases, a sensor design is illustrated which is substantially longer that it is thick or wide. In this manner, the sensor can extend across a significant portion of the vehicle in much the same way that the rod-in-tube sensors of the instant invention are implemented. These frangible sensors trigger by being broken, usually by means of a "Presser Member" and to thereby break an electric circuit.

As discussed below, in contrast, the sensors of this invention are not frangible and trigger by bending not by breaking.

4. Due to the requirement that tons of force are needed to trigger the Matsui sensor, rigid mounting thereof is a requirement. This is particularly important at the place on the sensor where triggering is intended to occur.

As set forth below, in contrast, the sensors of this invention trigger on bending and therefore should not in general be rigidly mounted particularly at the point where contact between the rod and tube is intended.

5. Tape switch implantation uses pressure actuated tape switches not those designed to by actuated by bending. Matsui explicitly states that the tape switch implementations disclosed are actuated by pressure (column 26 lines 20–23).

As discussed below, the sensors of the instant invention trigger on bending generally before sufficient force is available to crush the sensor.

6. The elongated sensors illustrated by Matsui are flexible lines systems, i.e., either frangible, pressure sensing tape switches, or sensors made by stretching a line or rope. All of these designs differ significantly from the rod-in-tube sensors of the instant invention. The remaining sensors disclosed are all point sensors which trigger when tons of force are applied to the sensor surface. In none of these cases is a sensor designed to be triggered by bending suggested.

7. In spite of the large potpourri of sensor designs disclosed, all of which have serious technical deficiencies, nowhere does Matsui suggest a rod-in-tube geometry of the sensor. The rod-in-tube geometry permits the sensor to be arbitrarily formed so that it covers all portions of the vehicle which are likely to be involved in a crash. In contrast, the elongated sensors of Matsui are typically shown mounted onto the bumper (erroneously designated as the fender) or immediately behind the bumper. An observation of frontal impacts shows that in approximately 30% of frontal airbag required accidents the bumper is not impacted. Thus, for these cases the Matsui sensor would not trigger.

For the purposes herein, the crush zone is defined as that part of the vehicle which crushes or deforms during a particular crash. This is a different definition from that used elsewhere and in particular in the above referenced technical papers. Also for the purposes herein, the terminology Crush Sensing Zone, or CSZ, will be used to designate that portion of the vehicle which is deformed or crushed during a crash at the sensor required trigger time. The sensor required trigger time is considered the latest time that a crash sensor can trigger for there to be sufficient time to deploy the airbag. This is determined by the airbag system designers and is a given parameter to the sensor designer for a particular crash. Naturally, there will be a different required sensor triggering time for each crash, however, it has been found, as reported in the above references, that the CSZ is remarkably constant for all crashes of the same type.

For example, the CSZ is nearly the same for all frontal barrier crashes regardless of the velocity of the crash. The same is true for 30 degree angle barrier crashes although the CSZ is different here than for frontal barrier crashes. Remarkably, and unexpectedly, it has also been found that when all frontal crashes at all different velocities are taken into account, the CSZ rearmost boundary becomes an approximate three dimensional surface lying mostly within the engine compartment of the vehicle, typically about ten to twelve inches behind the bumper at the center, and extending backward when crashes outside of the rails are considered. Finally, if a sensor is placed on this CSZ surface so that it is higher than the bumper level on the sides of the vehicle and lower in the vehicle center, as shown in FIG. 1 herein, it will do a remarkable job at discriminating between airbag required and non-deployment crashes and still trigger by the sensor required triggering time and before other sensors of comparable sensitivity. Naturally, this system is not perfect, however, it has been shown to do a better job than any other sensor system now in use.

It was this discovery which provided a basis for the subject matter described in U.S. Pat. No. 4,995,639 and then to the rod-in-tube sensor described in U.S patent application Ser. No. 08/024,076. During the process of implementing the rod-in-tube sensor, it was found that the same theory applies to rear impacts and that rod-in-tube sensors also have applicability to side impact sensing, although the theory is different.

In copending patent application (ATI-112), the theory of sensing rear impacts is presented and it is concluded that an anticipatory sensing system is preferred. This is because many people suffer whiplash injuries at rather low velocity impacts and if an inflatable restraint is used, the repair cost may be significant. To protect most people from whiplash injuries in rear impacts, therefore, a resetable system is preferred. The argument on the other side is that if the headrest is properly positioned, it will take care of all of the low velocity impacts and, therefore, an airbag can be used and reserved for the high velocity impacts where a crush sensing crash sensor would be used. The rod-in-tube sensor disclosed herein is, therefore, ideal for use with a deployable headrest mounted airbag for the same reasons that it is the best sensor for sensing frontal impacts. Since the rear of a vehicle typically has about one third of the stiffness of the vehicle front, electronic sensors will have even a tougher time discriminating between trigger and non-trigger cases for rear impacts. As disclosed in references 5 and 9 above, it is the soft crashes which are the most difficult for electronic sensors to sense in time.

Crush sensing crash sensors are not ideal for sensing side impacts alone, although the Volvo side impact system uses such a sensing system. This is because the sensing time is so short that there is virtually no crush (about two inches) at the time that the airbag must be deployed. Since there is very little signal out of the crush zone where electronic sensors are mounted, electronic sensors alone are not able to discriminate airbag required crashes from other crashes not requiring airbag deployment. The combination of the two sensors, on the other hand, can be used to provide a reliable determination. The crush sensor determines that there has been two inches of crush and the electronic sensor determines that the acceleration signal at that time is consistent with there being an airbag required crash. Thus, although they cannot be reliably used alone as a discriminating sensor for side impacts, the combined system does function properly.

An alternate use of the crush sensor such as the rod-in-tube sensor in side impacts is as a safing sensor. In this role, it merely determines that a crash is in progress and the main discriminating function is handled by the velocity sensing sensors such as disclosed in U.S. Pat. No. 5,231,253.

Applications for the rod-in-tube crush sensing crash sensor thus include frontal, side and rear impacts, where in each case they enjoy significant advantages over all other crash sensing technologies. Examples of the preferred implementations are described in the paragraphs below.

SUMMARY OF THE INVENTION

The crush sensing crash sensor of this invention is ideally adapted for installation at the edge of the CSZ for frontal and rear impacts of automobiles equipped with one or more inflatable passenger protective airbags. (Hereinafter, the term "airbag" will be used to mean all deployable passive passenger protective devices including airbags, seatbelts with tensioners and deployable nets.) When the vehicle is subjected to a crash of sufficient magnitude as to require the deployment of the passive protective device, a portion of the vehicle is crushed until it contacts the sensor. At least a portion of the sensor deforms by bending due to the forces exerted on it by the material contacting it. In a preferred embodiment, the sensor is constructed from a long rod and a tube with the rod positioned in the center of the tube by means of insulating spacers. When the tube bends, it contacts the rod between the spacers completing a circuit and causing deployment of the airbag. The rod and tube assembly can be formed in any convenient geometry, as discussed below, during manufacture so as to conform to the CSZ boundary of the vehicle. In this manner, the sensor is placed in the proper position to catch all crashes to the vehicle for which it was designed regardless of where on the vehicle the impact takes place.

The principle objects and advantages of this invention are:
1) To provide a single sensor which will sense all airbag desired crashes involving the either the front, rear or a side of the vehicle.
2) To provide a sensor which is much longer than it is wide or thick thus permitting it to sense crashes over a large area while occupying a relatively small space.
3) To provide a sensor which can be easily shaped so to be properly placed at the CSZ boundary across the entire front or rear of the vehicle.
4) To provide a crush sensor where the deformation required to trigger the sensor can be varied along the length of the sensor.
5) To provide a sensor to be used in conjunction with an electronic passenger compartment mounted sensor which will trigger on all of the airbag desired crashes which are missed by the electronic passenger compartment mounted sensor alone for either frontal, side or rear impacts.
6) To provide a simple and convenient sensor system consisting of a single discriminating sensor mounted at the CSZ boundary and a single arming sensor mounted in the passenger compartment for frontal and/or rear impacts.
7) To provide a sensor which remains closed after it triggers during a crash.
8) To provide an hermetically sealed crush sensing crash sensor.
9) To provide a crash sensor which has a hermetically sealed integral connector thereby eliminating the need for wires to be connected inside the sensor housing.
10) To provide a crush switch type crash sensor which does not require a strong mounting structure.
11) To provide a sensor which operates on bending.

Briefly, in accordance with the invention, the vehicle crush detecting device includes an electrically conducting, deformable tube, an electrically conducting rod positioned within the electrically conducting tube; and insulating means positioned at at least two points between the rod and the tube to insulate the rod from the tube. When the tube is deformed or bent by a force greater than a predetermined magnitude, e.g., by the crush of the vehicle proximate to or at the location at which the device is placed, it is forced into contact with the rod.

In use as a side impact crush detecting system in order to deploy an occupant protection apparatus for protecting an occupant in a side impact, the device is mounted in a position at the side of the vehicle so as to detect crush of the side of the vehicle and includes means for coupling the crush detecting device and the occupant protection apparatus such that upon completion of the electronic circuit, the occupant protection device is deployed. To this end, the crush detecting device has an elongate portion mounted in a position substantially parallel to a door panel in a door on the side of the vehicle. In another embodiment, the vehicle crash sensor system comprises a crush detecting switch changeable from an open position indicative of a non-crush situation and a closed position indicative of crush of a portion of the vehicle proximate to the switch; and an electronic sensor coupled to the crush detecting switch and comprising an accelerometer, and means coupled to the accelerometer, e.g., a microprocessor having an algorithm, for initiating deployment of the occupant protection device based on closure of the crush detecting switch and an analysis of output from the accelerometer indicative of a situation in which deployment of the occupant protection device is desired. The crush detecting switch may comprises an electrically conducting, deformable tube; an electrically conducting rod positioned within the electrically conducting tube; and insulating means positioned at at least two points between the rod and the tube to insulate the rod from the tube. The system may also include means for retaining the crush detecting switch in the closed position upon change of the crush detecting switch from the open position to the closed position.

Furthermore, the invention also relates to a method for sealing a device for mounting on an automobile, e.g., a connector of the crush detecting device, comprising the steps of: assembling the device creating an enclosed cavity therein, injecting an uncured rubber compound through at least one inlet port of the cavity in such a manner that at least one narrow passage leading from the cavity to an exterior thereof remains open during the injection process until the cavity is substantially full permitting air within the cavity to be displaced by the rubber compound; the passage being sufficiently narrow as to permit only a small amount of rubber compound to flow out of the assembly during the filling process, but large enough to permit air to easily flow out of the assembly; and curing the rubber compound.

Other objects and advantages of the present invention will become apparent from the following description of the preferred embodiments taken in conjunction with the accompanying drawings.

BRIEF DESCRIPTION OF THE DRAWINGS

The following drawings are illustrative of embodiments of the invention and are not meant to limit the scope of the invention as encompassed by the claims.

FIG. 2 is a perspective view taken along lines 2—2 of the sensor shown in FIG. 1 with the interior parts pulled apart to illustrate the interior structure.

FIG. 3 is a frontal view of another preferred embodiment of the sensor of shown mounted on a vehicle to sense frontal impacts with portions of the vehicle removed to permit viewing of the sensor.

FIG. 4B is the same view of the sensor shown in FIG. 4A after being impacted by the vehicle bumper during a crash.

FIG. 5 is a partial view of an alternate configuration of a vertical portion of the sensor of FIG. 4A showing it displaced rearward to reduce its sensitivity to impacts above the bumper.

FIG. 14 is a view of the sensor of FIG. 1 with portions of the tube and rod cut away illustrating the use of a grease to fill the cavity between the rod and tube to minimize the effects of vibration and to protect the surfaces of the conductors from corrosion.

DESCRIPTION OF THE PREFERRED EMBODIMENTS

Figure 1:
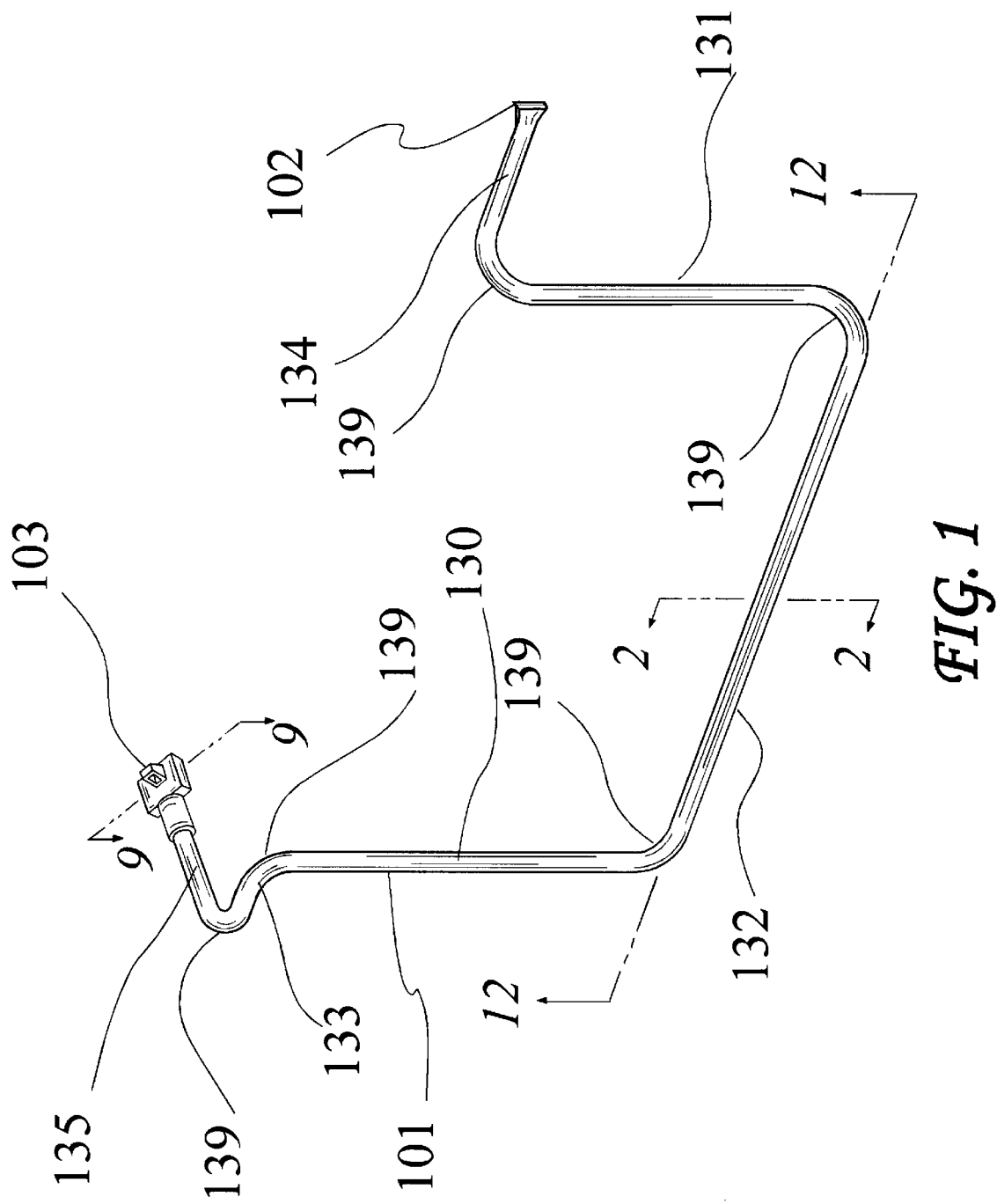
FIG. 1 is a perspective view of a preferred embodiment of the sensor of this invention for use in frontal impacts shown removed from the vehicle.

Referring to the accompanying drawings wherein like reference numerals refer to the same or similar elements, the crush switch sensor constructed in accordance with the teachings of this invention for use in sensing frontal impacts is shown generally at 101 in FIG. 1. The sensor 101 comprises a unitary, tubular member having two vertical portions 130 and 131, a lower horizontal portion 132, two upper horizontal portions 133 and 134 and a rearward projecting portion 135. The sensor is welded closed at an end 102 of horizontal portion 134 as described below and a header/connector 103 is attached to the sensor at the end of portion 135. The sensor is mounted to the front of the vehicle as shown in FIG. 3 and is constructed of a tube 105 and a centrally located rod 104 as shown in FIG. 2, which is substantially coextensive with the tube 105 but normally not in contact therewith. The sensor functions when it is bent at any position along the tube with the exception of bent sections or bends 139 which join the vertical portions 130,131 to the upper horizontal portions 133,134, respectively, described above and where plastic spacers 106 prevent the rod from contacting the tube. When the sensor 101 is bent during a crash, the rod 104, which is electrically conducting, contacts the tube 105, which is also electrically conducting, completing an electrical circuit which results in a deployment of the airbag, i.e., the passive restraint system.

The rod 104 is maintained in a central location within the tube as illustrated in FIG. 2 by means of the substantially cylindrical spacers 106 which are placed at each of the bends in the tube and, in one preferred embodiment, in the center of the lower horizontal portion 132 as shown in FIG. 2. The spacers are made from plastic or other suitable flexible material such as rubber thus preventing the completion of the electric circuit through the spacers 106. Although in the preferred embodiment shown in FIG. 1, spacers are only placed in the bends 139 and at the center of the horizontal portion 132, in other embodiments, spacers can be placed arbitrarily along the length of the sensor 101 in order to adjust the sensitivity of the sensor 101 to particular crash events. The effect of the spacers is dramatic. The deflection required to trigger the sensor at the center of the lower horizontal portion 132 is approximately 0.1 inches if the spacer 106 is not present, and greater than 1 inch if the spacer 106 is present.

Also, the tubular form of the sensor 101 is only a preferred embodiment, it may have other cross-sectional forms depending on the particular need while the spacers 106 similarly are constructed to substantially conform to the interior shape of the sensor 101. The variable positioning of the spacers provides the advantage of the selective sensitivity of the sensor 101 to crashes in specific areas along the length of the sensor 101. As shown, the spacers 106 extend circumferentially about the rod 104 only at discrete locations in the tube 105 so that entire circumferential portions of the rod 104 are spaced from the tube 105.

Although spacers 106 are shown to prevent electrical engagement of the rod 104 and the tube 105, other spacing means may also be provided to achieve the same function.

The crush switch sensor of this invention is shown mounted on a vehicle in FIG. 3 where a substantial portion of the vehicle has been removed to better illustrate how the sensor is mounted. In the configuration in FIG. 3, the rearward portion 135 of the sensor 101 has been eliminated and the sensor 101 extends only toward the outside of the vehicle. The vehicle structure shown consists of an upper radiator support 120, two vertical radiator supports 122 and 123 and a lower radiator support 132. The two vertical radiator supports 122,123 and the lower radiator support 132 are attached to rails 140 which are the structures of the vehicle which support the front end. The structure of a bumper structure 112 (of a particular vehicle) but not the bumper plastic cover is also illustrated in FIG. 3. The crush switch sensor 101 in accordance with the invention is attached to the upper radiator support 120 by means of attachment hardware 108 and 109 and to the lower radiator support 132 by means of attachment hardware 110 and 111. Obviously, any attachment means are suitable for these purposes.

Figure 4A:
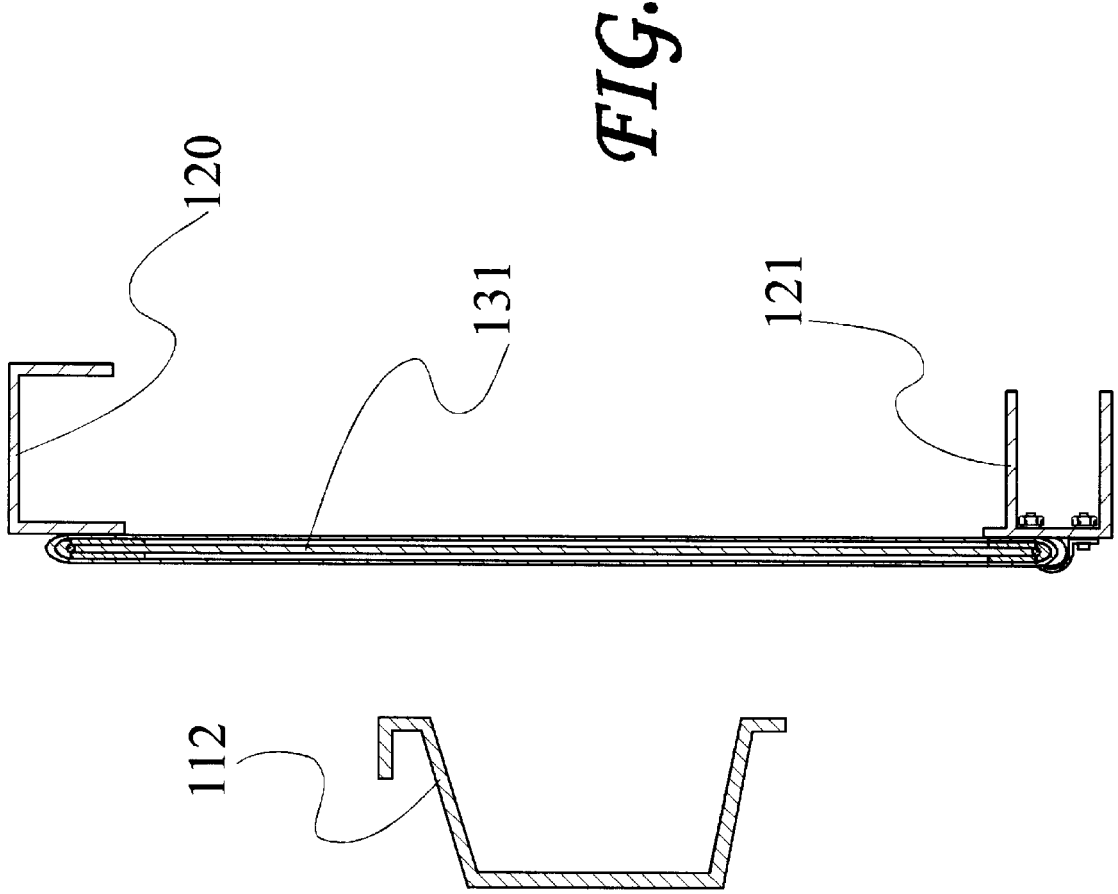
FIG. 4A is a view of a vertical segment of the sensor shown in FIG. 3 taken along lines 4—4 in a condition before being impacted by the vehicle bumper during a crash.

During a frontal impact with either a barrier or another vehicle, for example, bumper structure 112 is displaced toward the rear of the vehicle relative to the radiator supports of the vehicle to a position where it impacts the vertical portions 130 and 131, of the crush switch sensor 101, which are mounted so as to be spaced away by attachments 108–111 and thereby not in contact with the vehicle. This sequence is illustrated in FIGS. 4A and 4B which are views taken along lines 4—4 of FIG. 3. Upon impact with sensor vertical portion 131, bumper structure 112 causes the rod and tube assembly of sensor 101, and at least vertical portions 130,131, to bend which in turn causes the rod 104 to contact the inside of the tube 105, at locations 161, 162, 163, and 164, completing the electrical circuit and causing deployment of the airbag. Although in this case four contacts are made between the rod and the tube, only one is necessary to cause deployment of the airbag. In this manner, any crash which causes the bumper structure 112 to be displaced toward the rear of the vehicle will cause the sensor 101 to trigger by means of the completion of an electric circuit between the rod 104 and the inside surface of the tube 105.

A key advantage of the sensor in accordance with this invention is that it operates on bending. During a crash the impact to a particular point in or on the vehicle cannot be guaranteed but the fact that a line across the front, side or rear of the vehicle will not remain straight can almost assuredly be guaranteed. Therefore a sensor which is long and narrow and responds to bending will be highly reliable in triggering on even the most unusual crashes. The inventive sensor can be designed to cover a significant distance across the vehicle which increases the probability that it will be struck by crushed material and bent as the crush zone propagates in the vehicle during a crash. At the same time, the sensor is small so that it can be located in a position to sense the fact that one part of the vehicle has moved relative to some other part or that the structure on which the sensor is mounted has deformed. In this regard, sensor 101 may be positioned at the rear of the CSZ of the vehicle.

Not all crashes involve the bumper and in a survey of crashed vehicles (see SAE paper No. 930650) as many as 30% of the surveyed vehicles were involved in crashes where the bumper was not primarily involved. A typical crash of this type involves a vehicle which is braking and therefore pitching forward which lowers the front bumper and raises the rear bumper. If this first vehicle is struck in the rear by another second vehicle which is similarly pitching, the second striking vehicle will impact the first struck vehicle with the front bumper of the second striking vehicle riding underneath the rear bumper of the first struck vehicle. In this case, the bumper of the first struck vehicle will impact the grill and radiator of the second striking vehicle and displace the vertical portions 130 and 131 of the crush switch sensor in accordance with this invention. As such, airbag deployment is initiated.

When the bumper structure 112 is involved in an accident, it generally maintains its structural shape until it begins impacting the radiator and other structures behind the radiator. This is after it has impacted the sensor 101. Since the bumper structure 112 has not yet deformed when it strikes the sensor 101, the sensor 101 triggers on a crush of the vehicle equivalent to the distance between the rear of the bumper structure 112 and the sensor 101, plus the amount of sensor deflection required to trigger. If the bumper structure 112 is not primarily involved in the accident, the amount of penetration into the vehicle required to trigger the sensor 101, measured from the front of the bumper structure 112, will be greater by the amount of the thickness of the bumper structure 112. In this manner, the sensor system requires greater penetration into the vehicle in bumper underride crashes. This results in a longer time to trigger which is desired since such crashes are softer than those crashes which involve the bumper and therefore there is more time available before deployment of the airbag is required.

In some cases, it is necessary to further desensitize the sensor to bumper underride type crashes to make the sensor less sensitive to deer impacts, for example. Every year in the United States there are approximately 300,000 impacts with deer and in most cases airbag deployment is not needed. Currently used sensor systems, however, can cause the airbag to deploy on deer impacts. When impacted at high speeds, the crash pulse in the non-crush zone can be similar to the c rash pulse from a barrier crash up to the time that the decision must be made to deploy the airbag. In such cases, electronic sensors operating on the non-crush zone crash pulse will determine that the airbag deployment is required. Currently used crush zone sensors are typically mounted above the bumper and project outward from brackets attached to the upper radiator support. These sensors are impacted by a deer even at lower speeds and experience a velocity change sufficient to cause deployment of the airbag.

The crush switch sensor in accordance with the invention, however, can be desensitized in a manner such as shown in FIG. 5 so as to render it insensitive to deer impacts. In this case, a section designated at 138, of at least the vertical portion 130, of the sensor 101 has been displaced rearward to render it less sensitive to deer impacts.

Figure 6:
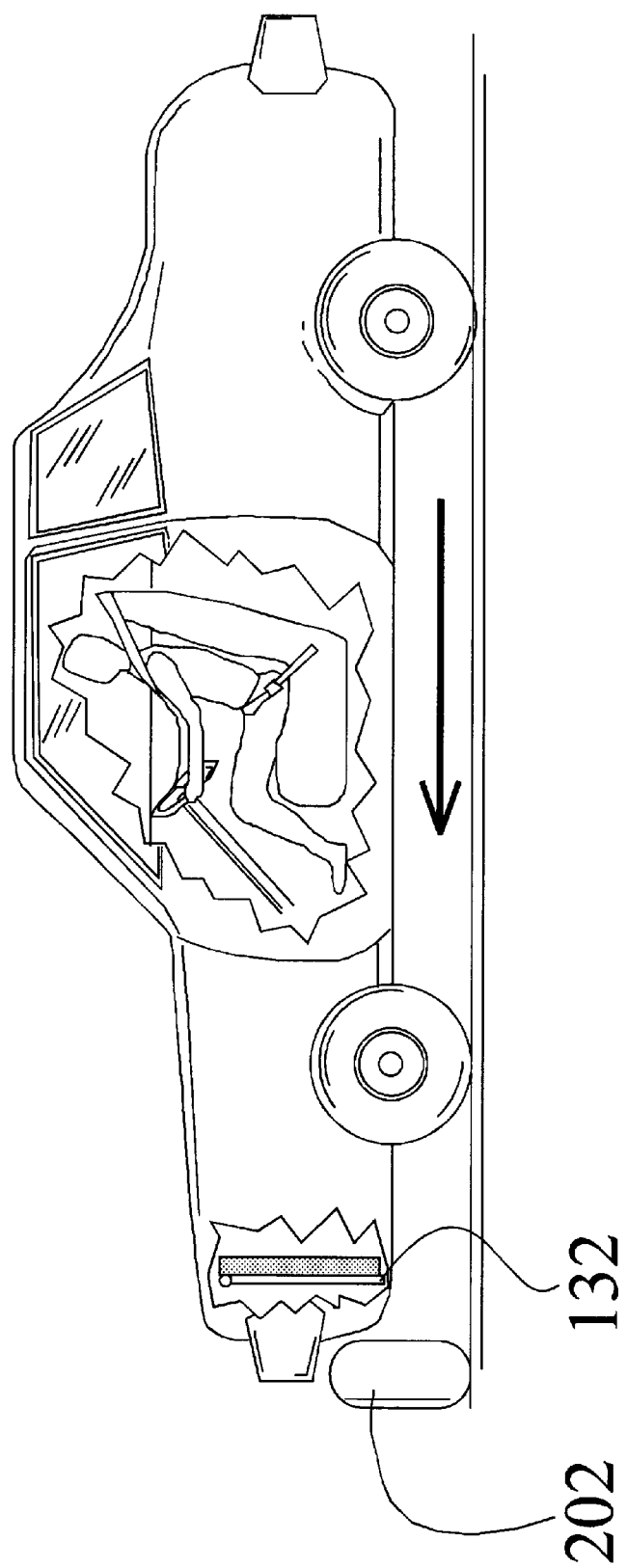
FIG. 6 is a view of a vehicle taken from the side, with certain portions removed, which is about to impact a low pole which misses the bumper, illustrating the ability of the sensor to respond to this type of crash.

Approximately 2% of frontal crashes involve impacts to the vehicle below the bumper. In a typical case, a vehicle impacts with a large stone, tree stump or short or low pole which miss the bumper. This type of accident is expected to become more common since in order to make vehicles more aerodynamic, vehicle hoods have been made lower and the radiators have also been lowered until as much as one-third of the radiator now projects below the lower edge of the bumper. An impact with a short pole or curb 202 such as shown in FIG. 6 where the pole interacts with the lower portion of the radiator, can result in an airbag required crash which will not be properly sensed by current sensor technology, e.g., ball-in-tube crush zone sensors. The ball-in-tube crush zone sensors are typically mounted above the bumper and therefore would not be in the crush zone for this kind of a crash causing them to trigger on the non-crush zone crash pulse resulting in a late deployment of the airbag. The preferred embodiment of the crush switch sensor of this invention shown in FIG. 6, on the other hand, stretches across the front of the vehicle and will trigger thereby causing the airbag to deploy in time on these crashes.

About the most common of all real-world airbag crashes involve impacts with poles. Pole impacts are some of the most difficult crashes to sense properly with current airbag sensor technology. Poles that can require airbag deployment vary in diameter from as little as about 4 inches to greater than about 24 inches. They involve such objects as fence posts, light poles, trees and telephone poles which are the most common obstacles found along the sides of roads. An impact into a pole at any position along the front of the vehicle can result in a serious accident requiring deployment of the airbag. The stiffness of the vehicle, however, varies significantly from one part of the front to the other. For most vehicles, the center front is the softest part of the vehicle, and the rails are the stiffest. In a typical accident, the bumper will buckle around a pole resulting in a soft crash pulse until the pole penetrates sufficiently into the vehicle that it begins to engage major structural members or the engine at which time the pulse becomes very stiff. This type of crash pulse is particularly difficult for non-crush zone sensors to sense properly.

Pole crashes are typically staged by automobile manufacturers during their airbag development programs, but they are limited in scope. They typically involve large poles that are one foot or more in diameter and are usually run at high speeds. It has been found, however, that thin poles at low speeds are much more difficult to enable proper sensing for airbag deployment than thick poles at high speeds. Non-crush zone sensors have a particularly difficult time in sensing pole crashes especially those involving thin poles at low velocities, since the crash pulse is very soft until it is too late to initiate airbag deployment. Conventional crush zone sensors, such as, the ball-in-tube sensor, function properly as long as the sensor is located in-line with the impact point of the pole. When this is not the case, and especially when the impact speed is low, ball-in-tube sensors can fail. A particular case, for example, involved a vehicle which has three ball-in-tube sensors mounted in the crush zone, one center mounted and one on each side approximately in line with the rails. This vehicle impacted a pole at approximately 15 miles per hour at a point midway between the front and side sensors. An examination of the vehicle showed that there was no crush at either of the sensor locations. In this case, the sensor triggered the airbag late based on the non-crush zone crash pulse as described in Breed U.S. Pat. No. 4,900,880 referenced above. Before the airbag deployed, the occupant had already impacted with the steering wheel and although conscious after the accident, later died from internal injuries. The crush switch disclosed here, in the embodiment illustrated in FIG. 3, would have triggered in time on this and all other pole impacts since it stretches substantially across the entire front of the vehicle, i.e., from one side to the opposite side.

In a small but significant percentage of automobile crashes (less than 2%), the point of impact is outside of the main vehicle supporting structure which is typically the rails. In a common accident, a vehicle impacts a pole at approximately the location of the headlights at a slight angle and the pole penetrates into the vehicle with little resistance until it encounters the front wheel structure at which point the vehicle rapidly stops. This crash cannot be properly sensed by any conventional airbag sensor system in use today. Electronic sensors will either trigger late or not at all due to the very soft nature of this crash up to the point where the pole impacts the wheel structure which is too late. Conventional crush zone sensors are usually mounted inside of the rail structure and thus are not in the crush zone for this crash, which is usually exterior of the rail structure. They also, therefore, would either not trigger or trigger late. The crush switch sensor of this invention as shown in FIG. 3 projects only slightly beyond the rail structure and therefore could also miss this type of crash. The extension of the upper horizontal portions 133 and 134, however, will permit the crush sensor to trigger on this type of crash. These extensions would trigger the deployment of the airbag in this pole crash and other airbag desired crashes outside of the rail structure. This crash is, as mentioned, a soft crash and therefore there will be substantial penetration before the sensor must trigger. The upper horizontal portions 133 and 134 therefore could be angled toward the rear in the vehicle to adjust the penetration required for the sensor to trigger.

In order for current technology crush zone sensors to sense crashes outside of the rails in time, additional sensors would have to be placed outboard of the rails. As mentioned above, even three sensors are insufficient to catch all pole crashes to the front of the vehicle and when bumper override crashes are considered, such as the low pole crash described above, additional sensors are required. A primary advantage of the crush switch sensor of this invention is that a single sensor can be used to sense crashes to all portions of the front of the vehicle. To achieve the equivalent coverage using conventional sensors would require at least five and probably more sensors. The manufacturing cost of a sensor described in this invention is about equivalent to the manufacturing cost of a single ball-in-tube crush zone sensor. Therefore, in addition to the substantial performance advantage, there is also a substantial cost advantage in using the sensor described herein.

In addition, a significant cost in a sensor system is the cost of the wires to connect each sensor to the remainder of the airbag system. It is typical for a wire and connector assembly plus the cost of insulation to be as much as half of the cost of the sensor itself. In the sensor described herein, a single wire assembly is all that is required to connect the sensor to the airbag system. With conventional crush zone sensors, a separate wire assembly is needed for each sensor. Finally, in order to minimize the possibility of the conventional crush zone sensor from rotating during angle crashes, for example, the mounting structure, typically the upper radiator support, is frequently strengthened to provide a more rigid mounting structure for the sensor. This modification to the vehicle structure is not required for the sensor described herein and therefore additional cost savings result.

Figure 7:
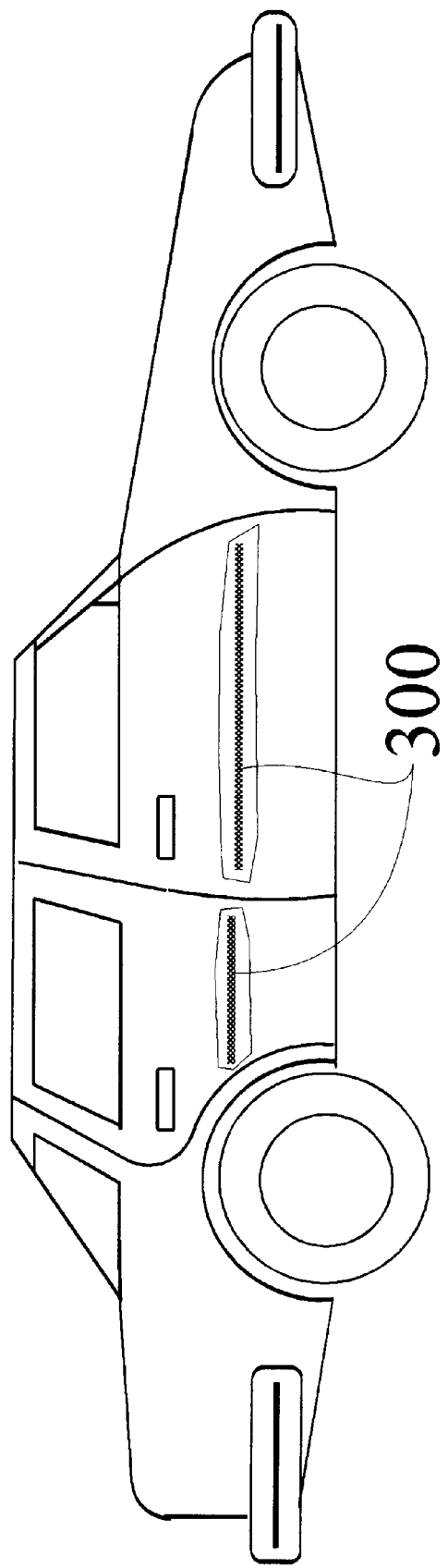
FIG. 7 is a side view of another preferred embodiment of the sensor in accordance with the invention shown mounted on a vehicle in a position to sense side impacts, with portions of the vehicle removed to permit viewing of the sensor.

As discussed above, and in several of the cited references on sensing side impacts, crush sensing alone is not the best technical solution for sensing side impacts. In spite of this fact, Volvo is now marketing a side impact airbag protection system where the sensor is a crush sensing sensor, although it is a point sensor and not a rod-in-tube geometry. In the event that other automobile manufacturers choose this approach, the rod-in-tube crush sensor described herein can be used as shown in FIG. 7 which is a side view of the sensor of this invention shown mounted on a vehicle to sense side impacts. One advantage of the rod-in-tube sensor is that it can cover a large area of potential crash sites at little additional cost. Thus, a single sensor can stretch along the entire door in whatever shape desired, e.g. linearly as shown at 300 in a position substantially parallel to the door panel. Thus, the sensor 300 would trigger upon impact at any location along the door. This solves a potential problem with the Volvo system which requires that the crash take place at a particular location for the airbag to be deployed.

The use of a rod-in-tube sensor for side impacts as well as one for frontal impacts is particularly attractive since it can be easily attached to the same diagnostic module. Thus, the same Diagnostic and Energy Reserve Module (DERM) can be used for frontal, side and even rear impacts. A particularly economic system results if these sensors are used for the entire vehicle providing a simple electronic diagnostic system is used in contrast to the complicated microprocessor based systems now in use. Thus, superior protection for the entire vehicle for crashes from any direction can be obtained at a substantial cost reduction over the currently used electronic systems.

Some of the objections for its use for side impact are partially overcome by placing the sensor sufficiently inboard from the outer portion of the vehicle as to require substantial crush of the door before the sensor is initiated. This, of course, delays firing of the airbag system and requires that the inflator inflate the airbag in a shorter period in order to make up for the loss of sensing time.

The sensor of this invention can also be used as a safing sensor for side impacts. In this case, it is used in combination with a velocity change sensor such as the electromechanical sensor having a moving mass described in U.S. Pat. No. 5,231,253 referenced above and included herein by reference. This imposes the dual requirement that velocity change plus vehicle crush both occur before the airbag deploys. It is referred here as a safing sensor since if it is mounted near the outer door skin, it will trigger on a very low velocity change such as one or two miles per hour as is the case for conventional safing sensors used in frontal impacts.

Finally, the use of the sensor of this invention in conjunction with an electronic sensor for side impacts will be discussed in more detail below.

The application of the sensor of this invention for rear impacts is in theory similar to that for frontal impacts. In contrast to frontal impact, there is not yet universal agreement as to the velocity change at which the deployment of a headrest mounted airbag is needed. Many whiplash injuries occur at very low velocity changes, as low as 5 mph. The replacement cost for such an airbag will be substantially less than for frontal impact airbags consequently again the deployment velocity could be made lower. On the other hand, if the headrest is properly positioned, only high velocity impacts would require airbag deployment. It is important to keep in mind that whiplash injuries are the most expensive group of automobile injuries even though they are usually not life threatening.

The choice of the marginal deployment velocity significantly impacts the location of the rod-in-tube sensor of this invention. Also, the rear end sections of automobiles differ substantially in their structure, stiffness, and suitable sensor mounting locations. In some vehicles the optimal sensor mounting location will be in the trunk lid. In others, especially if low velocity impacts are to be sensed, a location behind the bumper is appropriate. In many vehicles, the proper location is in the middle of the trunk volume, an impractical place to mount any sensor. For these vehicles, the sensor is designed to extend around on three sides of the trunk and desensitized through the use of spacers so that substantial deformation is required to trigger the sensor.

Figure 8:
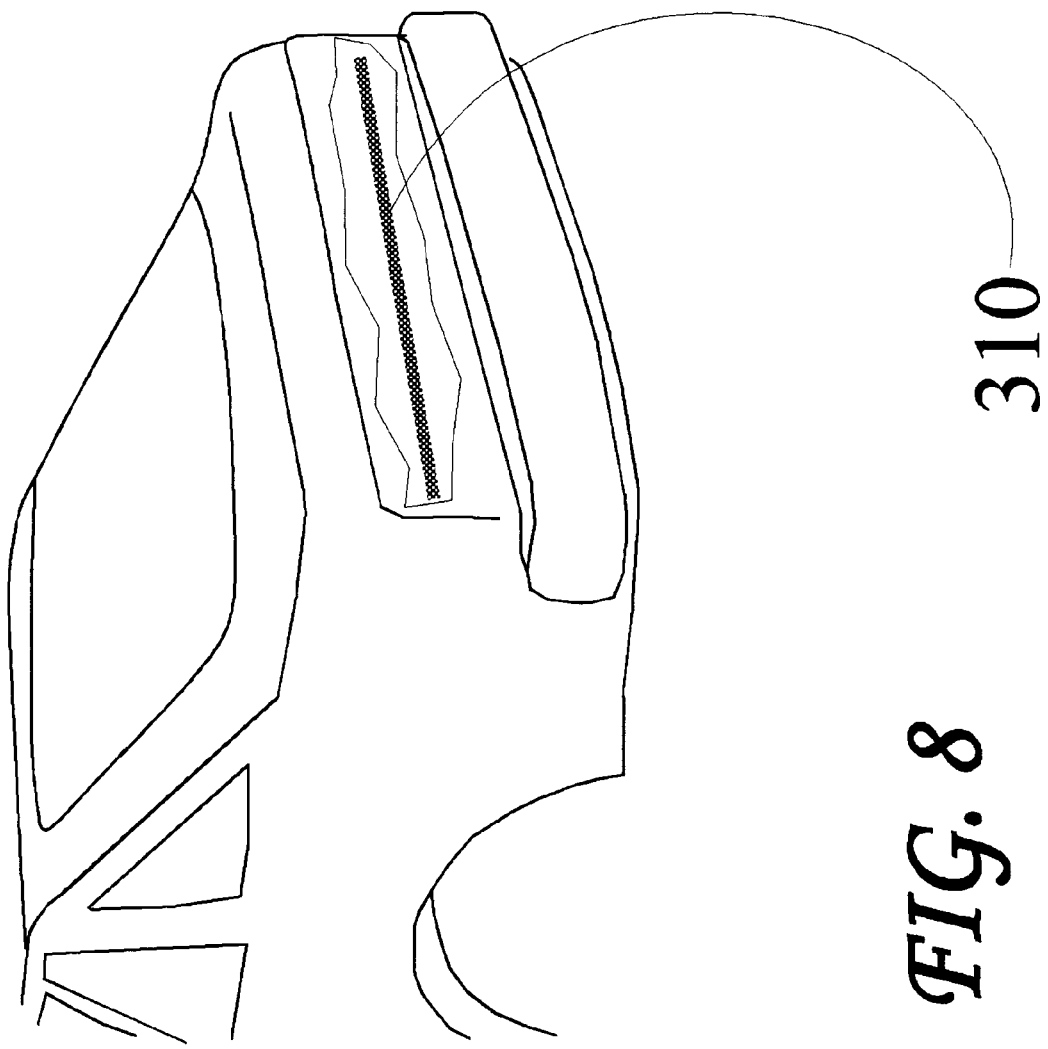
FIG. 8 is a rear view of another preferred embodiment of the sensor in accordance with the invention shown mounted on a vehicle in a position to sense rear impacts with portions of the vehicle removed to permit viewing of the sensor.

Due to this wide variability in sensor strategies and resulting sensor locations and geometries, FIG. 8 illustrates a general sensor 310 arbitrarily mounted to the rear of the vehicle to sense rear impacts, and as shown, in a position extending across substantially the entire width of the rear of the vehicle. Portions of the vehicle are removed to permit viewing of the sensor. The determination of the proper mounting position and sensor design follows the same strategy illustrated above and in the cited references.

The environment experienced by a sensor mounted in the front of the radiator on a vehicle is one of the most severe in the automobile. In addition to the extremes of temperature encountered between winter in Alaska and summer in the Arizona desert, this location is impacted by hail, stones, dust, dirt, salt water, radiator coolant, steam cleaner and occasionally even battery acid. This sensor must be capable of surviving any combination of these environments for the useful life of the car which is typically considered to be in excess of ten years. It is important, therefore, that this sensor be hermetically sealed. A great deal of effort has been put into the current ball-in-tube crush zone sensor to seal it from these environmental influences. Nevertheless, sensors that have been on vehicles have been dissembled and found to contain moisture. Although moisture would not have as detrimental effect to the rod-in-tube sensor described here as it does to ball-in-tube sensors, the sensor has nevertheless been designed to be truly hermetically sealed as described below.

Figure 9:
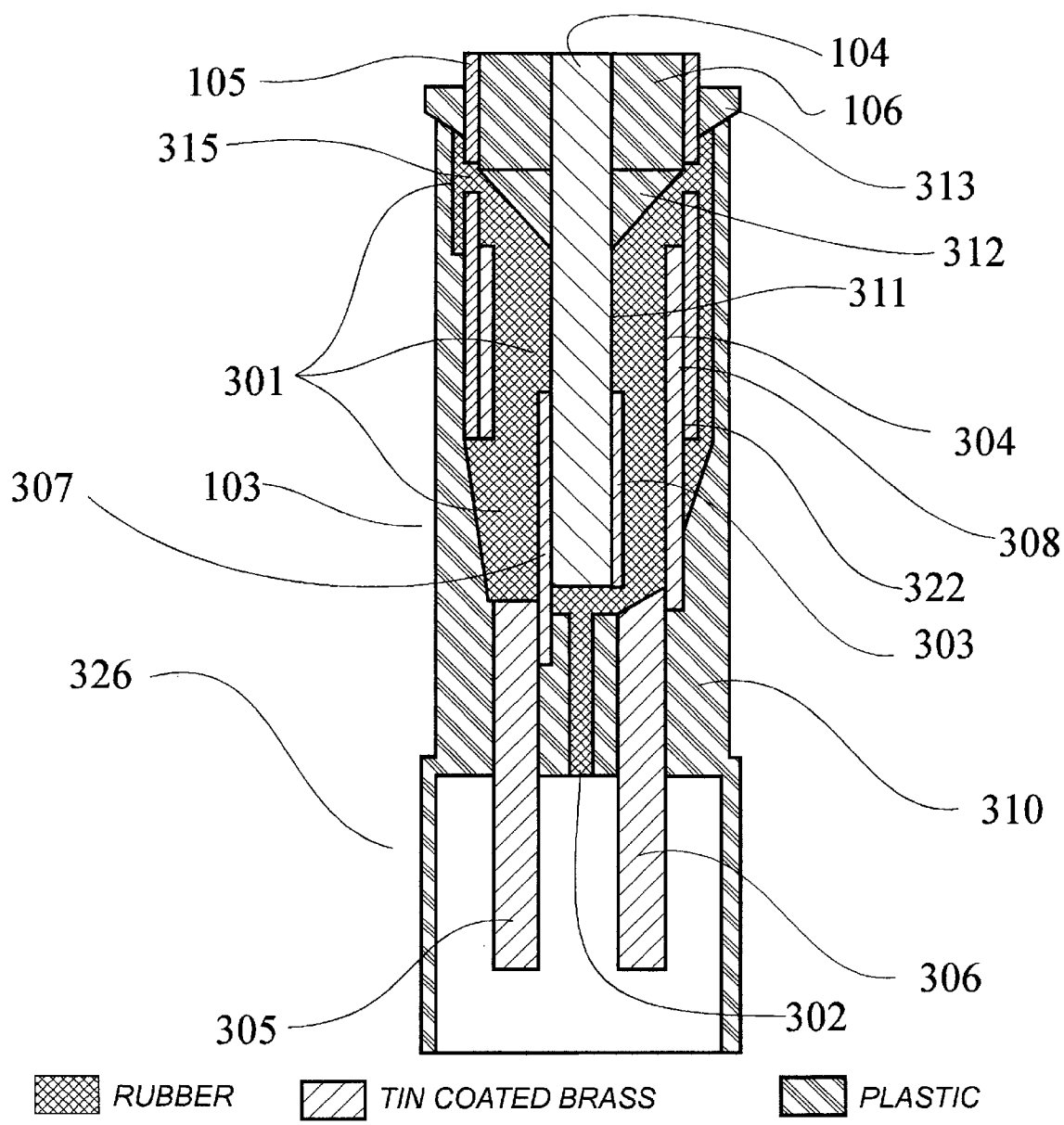
FIG. 9 is a cutaway view of the header/connector assembly of FIG. 1, taken along line 9—9, illustrating the construction details and in particular the method of sealing the sensor.

FIG. 9 is a cross section view of the header/connector 103 shown mounted on the tube 105 and rod 104. A spacer 106 is used to position the rod 104 inside the tube 105 as described above. The primary seal for this sensor is provided by injected and cured in place urethane or silicone rubber compound 301.

Current ball-in-tube crush zone sensors are attached to the vehicle wire harness and, thus to the remainder of the airbag system, by means of a pigtail which is a wire assembly emanating from the sensor at one end and having a connector at the other end. It is believed that the environment in front of the radiator is too severe for connectors, therefore connectors integral with the sensor have not been considered.

This pigtail is one of the most expensive parts of the standard ball-in-tube crush zone sensor. Substantial cost savings result if the connector could be made integral with the sensor. This has been accomplished in the crush switch sensor of the current design as shown in FIGS. 1, 3 and 9.

The sealing technique used for the header/connector is to form a rubber mold within the housing and to pump a rubbery material such as urethane or silicone rubber, or similar compound, 301 into the cavity. This is accomplished in such a manner that the air is displaced and forced to flow through various clearances between the parts in much the same manner as air is forced out of a plastic injection mold when the liquid plastic is forced in under pressure. The rubber compound 301 is injected through hole 302 in the bottom of the connector portion of the assembly and flows upward as the air flows out through holes or slots 315 in tube 105 and finally out of the assembly through the clearance between the tube 105 and a plastic dam 313. The plastic dam 313 is a part which fits snugly to the tube and also against a plastic header body 310 of the connector 103. These snug fits permit the air to flow while offering a substantial resistance to the flow of the rubber 301. In this manner and through the proper geometric shaping of the various parts, all but a few minute air bubbles are effectively removed and the rubber thereby attaches and seals to all of the relevant surfaces.

A second dam 312 is also used to limit the passage of the rubber into the main body of the sensor. The spacers 106 typically contain a groove to permit the passage of grease, as will be explained below, and the dam 312 effectively seals area and prevents passage of the rubber. Since the grease is typically pumped into the sensor after the header/connector is assembled, this last spacer 106 adjacent to the connector 103 need not have the groove and thus the dam and spacer can be made as one part if desired.

The seal is thus made by the steps of:
a) assembling the header/connector device to the rod-in-tube creating at least one enclosed cavity therein having at least one inlet port for injecting a rubber compound and at least one narrow passage for air to escape, this passage being sufficiently narrow as to permit only a small amount of rubber compound to flow out of the assembly during the filling process , but large enough to permit air to easily flow out of the assembly;
b) injecting an uncured rubber compound through the inlet port(s) in such a manner that the at least one narrow passage remains open during the injection process until the cavity is substantially filled permitting air within the cavity to be displaced by the rubber compound; and
c) curing the rubber compound.

Usually a room temperature curing rubber compound is used and thus the curing process consists of storing the assembly until the curing is complete. In many cases, the temperature of the assembly is elevated to accelerate the curing process and in others the rubber is exposed of ultra violet light to effect the cure.

Tests were run on this system whereby the assembly was held at about −40 degrees Celsius for at least twelve hours and then immersed into boiling water and then into near freezing water containing a penetrating die. After tens of cycles, the test units were cut open to search for the penetration of the die which would indicate a failure of the seal. None was found. In contrast, a commercially available ball-in-tube sensor failed on the first cycle. This test is more severe than any sensor is likely to experience in the field and therefore proves the viability of the sealing system.

The preferred plastic material used for the header/connector is 30% glass filled polyester although other plastic materials would work as well. Standard crush zone sensor connectors are frequently made from unfilled Nylon and this would also be suitable for the header/connector design used in the sensor of this invention. Although unfilled Nylon has a high coefficient of thermal expansion, the urethane or silicone rubber has even a higher one and therefore the seals between the nylon and metal parts will remain intact.

The lower portion 326 of the header/connector assembly 103 shown in FIG. 9, is in the form of a mating connector which attaches to the wire harness connector provided by the automobile manufacturer. Connector pins 305 and 306 are extensions of the header pins 303 and 304, which are connected to the rod 104 and tube 105, respectively, and are designed to mate with the appropriate connector, although not shown in detail here. Upon completion of the circuit via contact between the rod 104 and the tube 105 upon a crash, current flows through the connectors 305,306, header pins 303,304 and rod 104 and tube 105. The header pins 303,304 are formed from sheet brass in such a manner that they surround the rod 104 and tube 105 and are electrically connected thereto. This is accomplished in the case of the tube, for example, by solder coating the end 322 of the tube 105. A mating portion 308 of the header pin 304 fits snugly inside the tube and, through induction heating, is soldered to the tube. Similarly, mating portion 307 of header pin 303 surrounds the rod 104 which has been soldered coated at its end 311.

The header pins 303 and 304 are first formed from tin plated brass material to the proper shape and then placed in a mold in an insert molding operation to form the header/connector assembly 103.

Figure 10:
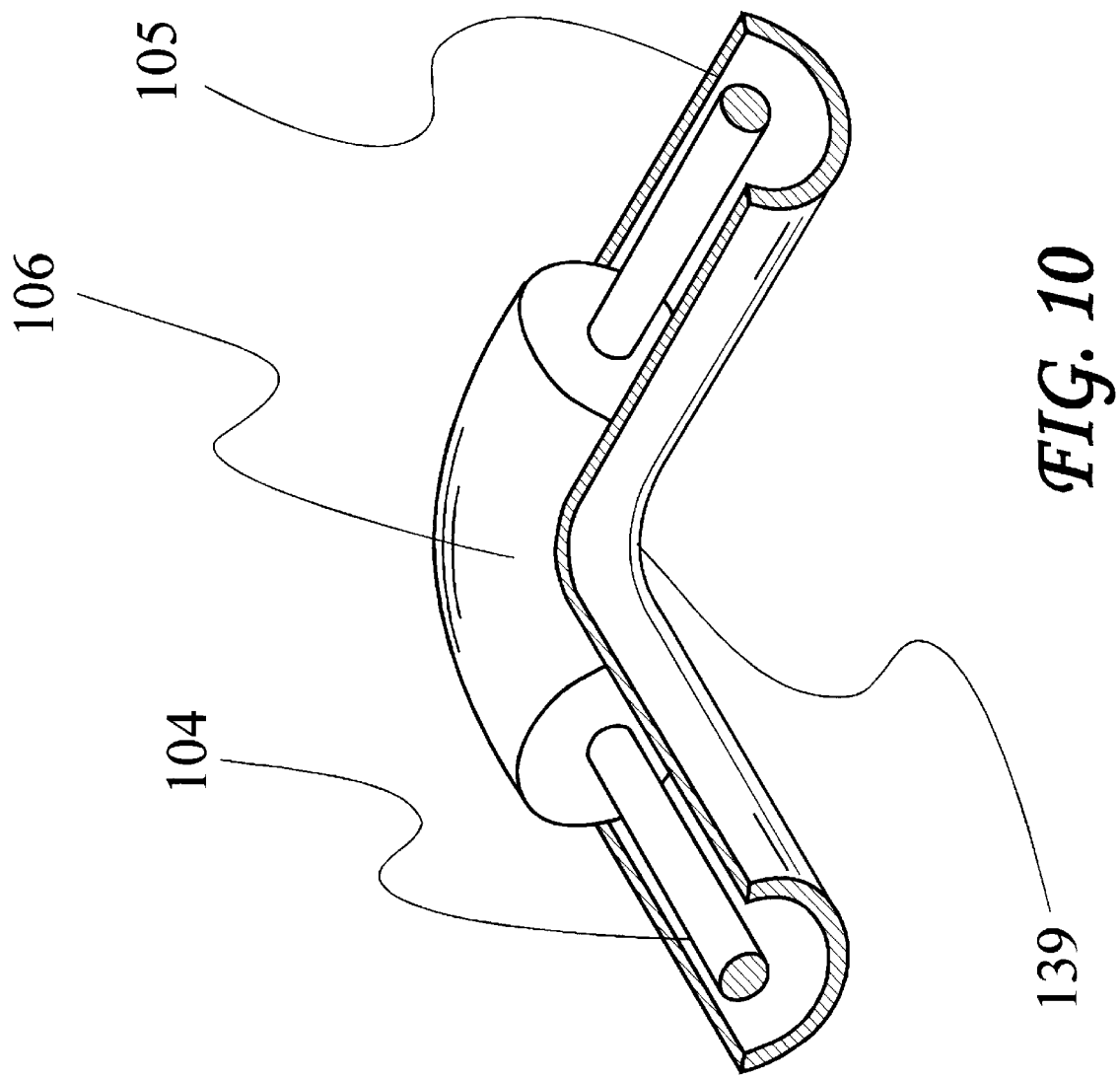
FIG. 10 is a partial cutaway view of a portion of the sensor illustrating a bend in the sensor.

Spacers 106, in addition to their use in a straight portion of the rod and tube assembly as shown in FIG. 2, are also placed in each of the bends 139. A partial cutaway view of a typical bend 139 is shown in FIG. 10. During assembly the spacers are placed on the rod and the rod is inserted into a straight tube with the spacers located at each position where the tube will be bent. The tube is then bent at spacer locations using conventional tubing benders and the rod is also forced to bend by virtue of the spacer. The spacers are formed from extruded plastic tubing and are slightly smaller in diameter than the tube. The internal diameter of the spacer, however, is such as to require a press fit onto the rod. Thus, the spacers 106 are held firmly on the rod 104 as the rod is inserted into the tube 105. Spacers used in the bends are typically about 3 inches long when used with a 0.5 inch tube and a one inch bend radius.

In a typical large tube assembly, the tube outside diameter is approximately 0.5 inch and the wall thickness approximately 0.035 inches and in a small tube assembly the outside diameter is approximately 0.25 inches and the wall thickness is about 0.02 inches. The large tube design is used when there is no convenient structure to mount the sensor against and it is vulnerable to abuse, while the thin or small tube design is used when it can be mounted nearly flush against the radiator support, for example, or in a protected location such as inside of the vehicle door.

Figure 11:
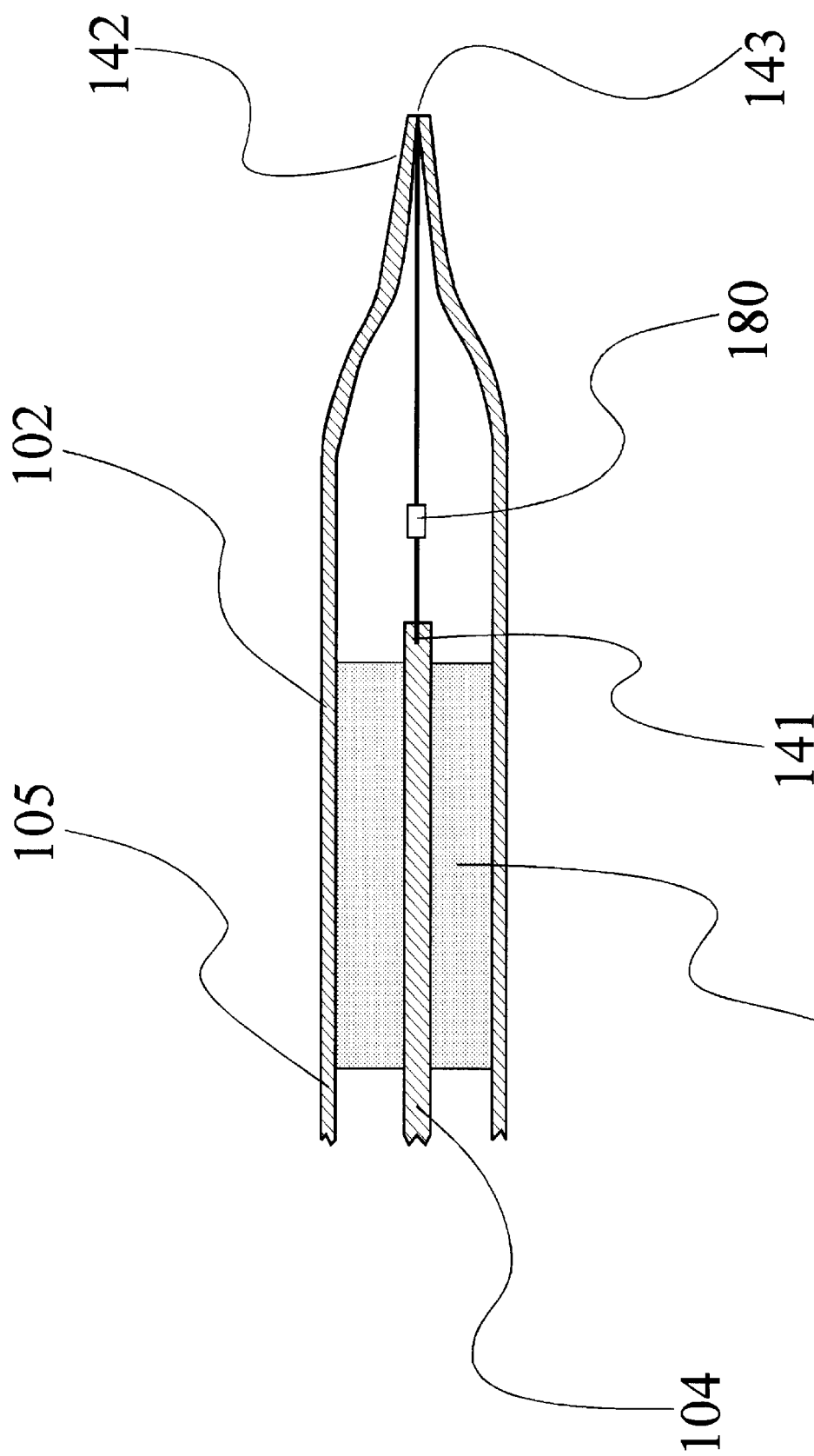
FIG. 11 is a cutaway of the sensor end showing the welded seal.
Figure 12:
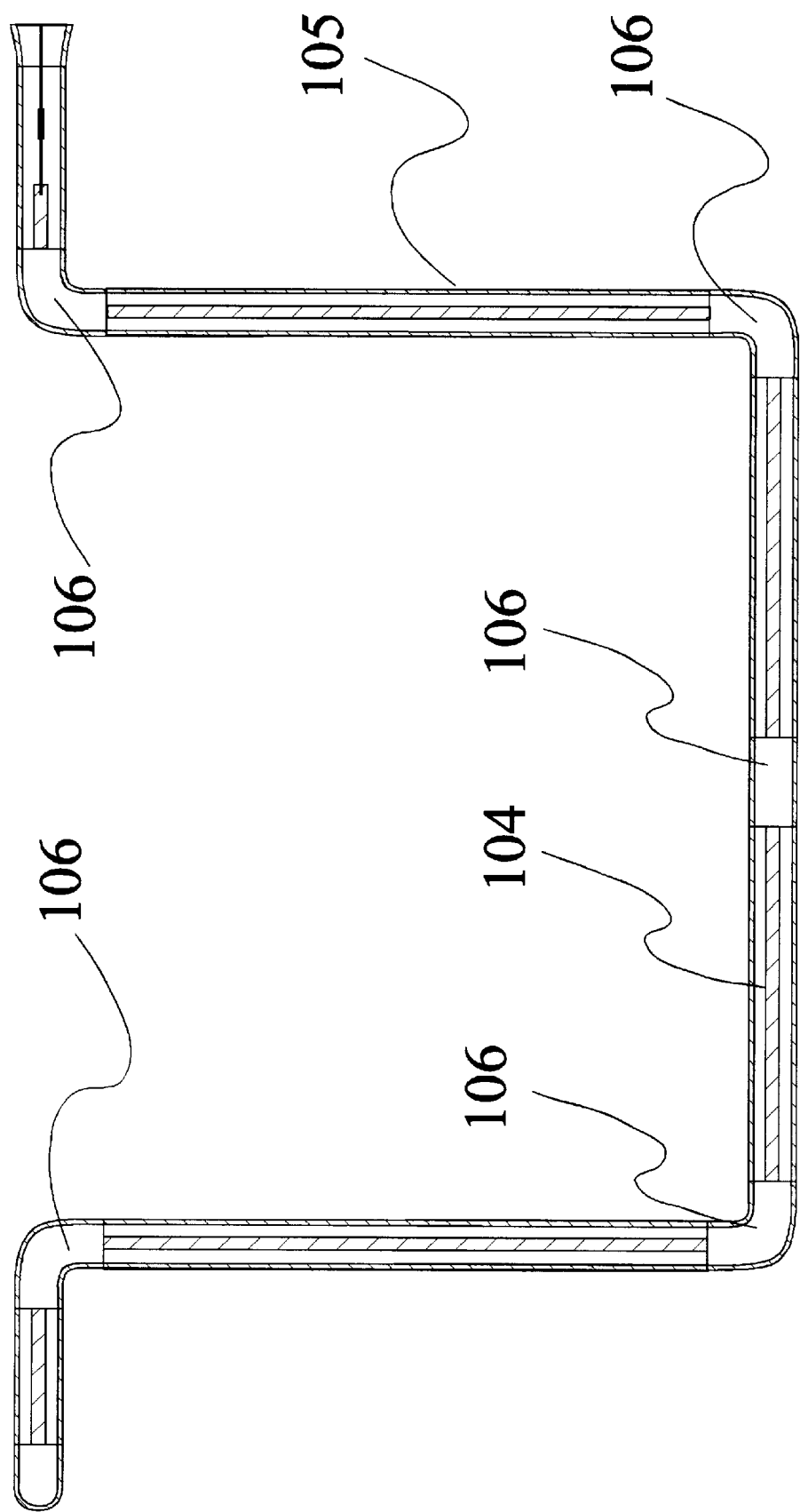
FIG. 12 is a view of the sensor of FIG. 1 with part of the tube and rod cut away illustrating the positioning of spacers within the sensor and their use to change the sensitivity of the sensor to deformation.

The end 102 of the sensor which does not have the header/connector 103 is welded closed as shown in FIG. 11. Some vehicle manufacturers require a diagnostic resistor to be placed across the contacts in the sensor. This is accomplished as shown in FIG. 11 by attaching a resistor 180 to an end 141 of rod 104 and to an end 142 of tube 105. The end 142 is formed by squeezing the tube in the appropriate set of dies which gradually taper and flatten the tube, squeezing the end of resistor 180 and closing off the tube with a straight line seal. The end of this seal, 143, is then TIG welded using conventional equipment to assure a hermetic seal. FIG. 12 is a view of the sensor of FIG. 1, with half of the tube 105 and rod 104 removed but showing complete spacers 106, taken along lines 12—12 and showing the location of all of the spacers 106 and the rod 104 and tube 105.

If the passenger compartment discriminating sensor is of the electronic type, the triggering threshold can be changed based on the condition of the crush switch sensor in the crush zone. Passenger compartment sensors sometimes trigger late on soft long duration frontal crashes even though the velocity change is significantly higher than the desired deployment threshold. See for example reference 4 above. In such a case, the fact that the crush switch sensor has triggered can be used to modify the velocity change required for the electronic sensor to trigger. Thus, in one case, the passenger compartment sensor can prevent the deployment of the air bag when the velocity change is too low as in the animal impact situation discussed above and in the second case, the crush zone sensor can cause the discriminating sensor to trigger faster in a soft crash and minimize the chance of a late triggering condition where the occupant is out of position and in danger of being injured by the deploying air bag.

Figure 13:
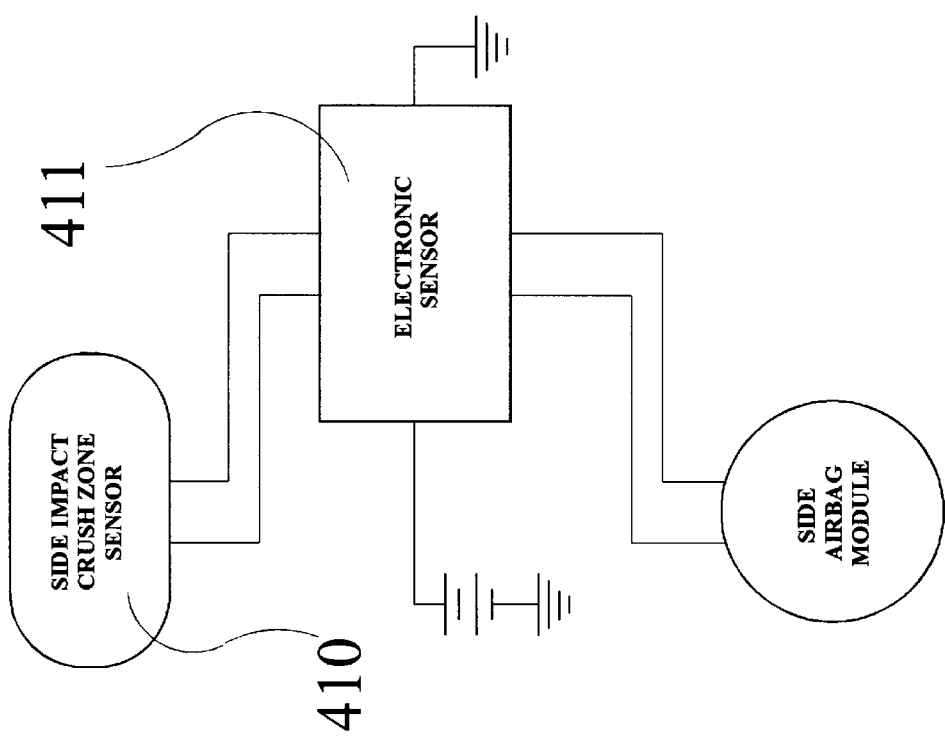
FIG. 13 is a circuit schematic showing a side mounted sensor used as an input to an electronic sensor.

FIG. 13 shows schematically such a circuit applied to side impacts where an electronic sensor 411 triggers deployment of the airbag and crush sensor 410 is used as input to the electronic sensor. In this case, the current carrying capacity of the crush sensor can be much less and thinner wires can be used to connect it to the electronic sensor. In one scenario, the electronic sensor may be monitoring an event in progress when suddenly the crush sensor signals that the vehicle has crushed to where the sensor is mounted. The electronic sensor now uses this information along with the acceleration signal which it has been monitoring to determine the magnitude of the crash. The crush sensor informs the electronic sensor that a crash is in progress and the electronic sensor, which comprises an accelerometer and a microprocessor with a crash analysis algorithm, determines the severity of the crash based on the acceleration signal. If the acceleration signal is present but the crush sensor fails to record that a crash is in progress then the electronic sensor knows that the acceleration signal is from either a non-crash event or from a crash to some part of the vehicle, such as in front of the A-pillar or behind the C-pillar where deployment of the airbag is not warranted. The A-pillar is the foremost roof support member on which the front doors are hinged and the C-pillar is the rearmost roof support pillar usually at or behind the rear seat.

An example of an electronic crash sensor algorithm can be found in patent application to D. S. Breed titled "Method and Apparatus for Sensing a Vehicle Crash," Ser. No. 08/476,076, filed Jun. 7, 1995.

A typical length of the span between spacers for the vertical portion 130 and 131 of FIG. 1 is approximately 10–15 inches. In this configuration, the rod will actually deflect and contact the tube during minor accidents and therefore in the preferred embodiment of the design, the tube is filled with a damping material which is typically a viscous liquid or grease which has been formulated to operate over the required temperature range of from −40 C to 125 C. For the purposes of this disclosure, the term grease will be used to include all flowable materials having a viscosity between 100 and 100 million centipoise. This would include, therefore, all silicone and petroleum and other natural and synthetic oils and greases in this viscosity range. This grease 600 is shown in FIG. 14 where half of the tube 105 has been removed to show the grease 600 filling substantially the entire tube. Small voids 601 are intentionally placed in the grease to allow for differential expansion between the grease and the tube due to variations in temperature. When grease is used, small channels, not shown, are provided in the spacers 106 to permit the grease to flow past the spacers as the sensor is pumped full of the grease.

The sensor described and illustrated above is designed to catch all impacts to the vehicle regardless of where they occur providing the sensors are properly located. For frontal and rear impacts the severity of the crash required to cause sensor triggering is determined by the amount of crush of the vehicle at each location which is necessary to cause the sensor to close. The amount of crush necessary to trigger the sensor at any location can be varied arbitrarily by the distance the sensor is located from the front or rear of the vehicle, by the location and characteristics of spacers in the sensor and by the location and characteristics of the supports that are used as discussed above.

Steel has been used for the materials for the rod and tube for the preferred embodiment described herein. The tube is in an annealed state to promote easy forming to the required shape and to promote deformation during the crash. The rod, on the other hand, is typically hardened so as to maintain its spring temper and promote good contact forces with the tube when the combination is bent. The outside of the sensor is coated with a protective coating to prevent it from rusting during the estimated 10 year life of the vehicle. The interior surfaces are coated with grease to prevent corrosion in those cases where the entire sensor in not filled with grease. Naturally, other materials such as aluminum, brass or even plastic with an electrically conductive surface coating could be used for the rod and tube.

The rod and tube described above, for the large tube design, have been designed to require approximately fifty to one hundred pounds of force in order to cause the sensor to trigger. This is to minimize the chance of inadvertent deployment during routine vehicle maintenance. For cases where the sensor is in a protected location, the small tube design typically uses a 0.25 inch diameter tube with a 0.0625 inch diameter rod.

Once the crush switch of the present design triggers it remains latched in the conductive state for the duration of the crash. This important feature as discussed in detail in the above referenced patent applications, guarantees overlap between the triggering of the crush zone sensor and the passenger compartment mounted arming sensor when used for frontal and rear impacts.

The sensor described and illustrated herein utilizes a diagnostic resistor. Other systems require a complete monitoring of the sensor without the use of a diagnostic resistor. This can be accommodated in the present design by using header/connectors on both ends of the sensor. In this case, diagnostic currents could pass through both the rod and the tube independently permitting small changes in the total resistance of the entire circuit to be diagnosed.

The tube of the sensor described herein is usually electrically grounded to the vehicle. In some applications, it may be desirable not to ground the outside of the tube in which case the tube would be surrounded by an insulating plastic tube. The use of a grounded outer tube has the advantage of providing shielding from electromagnetic radiation for the rod and thus minimizing the chance of an inadvertent signal reaching the electronic sensor, for example, as the vehicle passes through strong electromagnetic fields.

A primary advantage of the sensor described herein is its coaxial design which permits arbitrarily shaping of the sensor to adapt the sensor to a particular vehicle and to a particular place on that vehicle. There are, of course, other designs which could also be arbitrarily shaped including, but not limited to, tubes having a square, elliptical or triangular cross section. All of these and similar geometries are considered tubes for the purpose of this invention. Similarly, the rod can take on a variety of shapes without departing from the teachings of this invention. In particular, the rod can also be a tube which has advantages in minimizing the effects of vibration. The rod need not be round and can be triangular, elliptical, square or even ribbon shaped. All of these geometries are considered rods for the purposes of this invention.

Another key feature of this invention is that, when the sensor is properly mounted on the vehicle, plastic deformation of the tube generally occurs prior to triggering of the sensor and always occurs in a crash where the deployment of the airbag is required. As discussed above, this results in the sensor latching closed during the crash but is also prevents it from being reused on the same or another vehicle. In an alternate configuration, the dimensions of the rod and tube and the material properties are chosen so that the sensor can be caused to trigger with sufficient force without causing plastic deformation. This permits manual testing of the sensor after it is mounted on the vehicle as desired by some vehicle manufacturers. In most embodiments, the sensor can be made to trigger prior to mounting onto the vehicle by manual bending without plastic deformation. This permits the sensor to be tested after it has been manufactured but before mounting onto the vehicle.

The use of grease to dampen the motion of one or more of the parts of a crash sensor has been disclosed herein. Other crash sensor designs, and particularly crush switch sensor designs, could also make use of a grease to surround and dampen the motion of one or more of the internal parts of the sensor.

The hermetic sealing system disclosed herein has permitted the first use of an integral header/connector thus eliminating the need for the pigtail and substantially reducing the cost of airbag sensors for frontal mounting in the "splash zone". Naturally now that this system has been disclosed other applications of this system to other types of crash sensors will become obvious to those skilled in the art.

If two sensors of the type disclosed in this invention are mounted on a vehicle with one closer to the front than the other, then, during a crash, the forwardmost sensor will trigger first followed by the second more rearward sensor. If the spacing between the sensors is known, an estimate of the crash velocity can be obtained by measuring the time between switch closures. In this manner, the use of two switches can be used to determine the crash velocity.

There has thus been shown and described an improved rod-in-tube crush switch crash sensor which fulfills all the objects and advantages sought after. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims.

What is claimed is:

1. A vehicle crush detecting device in combination with a vehicle comprising:

an electrically conducting, deformable tube;

an electrically conducting rod positioned within said tube;

insulating means positioned at at least two points between said rod and said tube for insulating said rod from said tube; and attachment means for attaching said tube to said vehicle at at least two spaced apart locations to provide at least one free, unrestrained span of said tube between said at least two spaced apart locations which is spaced away and not in contact with any portion of said vehicle, whereby when said tube is deformed by a force greater than a predetermined magnitude during crush of the vehicle, said tube contacts said rod in response to the crush of the vehicle thereby completing an electric circuit indicative of crushing of the vehicle.

2. The device in accordance with claim 1, wherein contact of said rod by said tube is caused by bending of said tube.

3. The device in accordance with claim 1, further comprising mounting means for mounting said crush detecting device in a front region of the vehicle so as to detect crush of the front region of said vehicle.

4. The device in accordance with claim 1, wherein said vehicle has a side and a deployable occupant protection apparatus for protecting an occupant in a side impact further comprising mounting means for mounting said crush detecting device in a side of the vehicle so as to detect crush of the side of said vehicle and means for coupling said crush detecting device and said occupant protection apparatus such that upon completion of said electronic circuit, said occupant protection device is deployed.

5. The device in accordance with claim 4, further comprising an electromechanical sensor having a moving mass coupled to said crush detecting switch.

6. The device in accordance with claim 4, further comprising an electronic sensor.

7. The device in accordance with claim 4, wherein said crush detecting device has an elongate portion, said elongate portion of said crush detecting device being mounted by said mounting means in a position substantially parallel to a door panel in a door on said side of said vehicle.

8. The device in accordance with claim 1, further comprising mounting means for mounting said crush detecting device in a rear of the vehicle so as to detect crush of the rear of said vehicle.

9. The device in accordance with claim 1, wherein said rod and said tube are unitary and said rod is substantially solid.

10. The device in accordance with claim 1, wherein said rod and said tube have a substantially elongate portion.

11. The device in accordance with claim 1, wherein said insulating means comprise spacers extending circumferentially about said rod only at discrete locations in said tube.

12. A vehicle crush detecting device in combination with a vehicle comprising:

an electrically conducting, deformable tube, said tube containing greases an electrically conducting rod positioned within said tube; and insulating means positioned at at least two points between said rod and said tube for insulating said rod from said tube;

whereby when said tube is deformed by a force greater than a predetermined magnitude during crush of the vehicle, said tube contacts said rod in response to the crush of the vehicle thereby completing an electric circuit indicative of crushing of the vehicle.

13. The device of claim 12, wherein said tube is not completely filled with grease such that voids are present in said tube to allow for differential expansion between the grease and said tube.

14. In a vehicle having a deployable occupant protection device, a vehicle crash sensor system comprising:

a crush detecting switch changeable from an open position indicative of a non-crush situation and a closed position indicative of crush of a portion of said vehicle proximate to said switch; and an electronic sensor coupled to said crush detecting switch and comprising;

an accelerometer, and means coupled to said accelerometer for initiating deployment of said occupant protection device based on closure of said crush detecting switch and an analysis of output from said accelerometer indicative of a situation in which deployment of said occupant protection device is desired.

15. The system in accordance with claim 13, further comprising means for retaining said crush detecting switch in said closed position upon change of said crush detecting switch from said open position to said closed position.

16. The system in accordance with claim 13, further comprising mounting means for mounting said crush detecting switch on a side of said vehicle so as to detect crush of the side of said vehicle.

17. A vehicle crush detecting device in combination with a vehicle comprising:

an elongate, electrically conducting, deformable tube, said tube having an inner circumferential surface and an outer circumferential surface;

an elongate, electrically conducting rod positioned within said tube, said rod having an outer circumferential surface;

attachment means for attaching said tube to said vehicle at at least two spaced apart locations to provide at least one free, unrestrained span of said tube between said at least two spaced apart locations which is spaced away and not in contact with any portion of said vehicle; and insulating means positioned at at least two longitudinal points between said rod and said tube for insulating said rod from said tube, said insulating means being arranged to separate the entire outer circumferential surface of said rod from the entire inner circumferential surface of said tube around the entire outer circumference of said rod such that said tube is deformable by the crush of the vehicle about its entire circumference into contact with said rod; whereby when said tube is deformed by a force greater than a predetermined magnitude during crush of the vehicle, said tube contacts said rod in response to the crush of the vehicle thereby completing an electric circuit indicative of crushing of the vehicle.

* * * * *